US007457220B2

(12) United States Patent
Takakuwa et al.

(10) Patent No.: US 7,457,220 B2
(45) Date of Patent: Nov. 25, 2008

(54) INFORMATION RECORDING DEVICE AND METHOD, INFORMATION RECORDING MEDIUM, AND RECORDING CONTROL COMPUTER PROGRAM

(75) Inventors: Nobuyuki Takakuwa, Saitama (JP); Yasuko Fukuda, Saitama (JP); Takao Sawabe, Saitama (JP); Tohru Kanegae, Saitama (JP); Masanori Nakahara, Saitama (JP); Takeshi Koda, Saitama (JP)

(73) Assignee: Pioneer Corporation, Tokyo (JP)

( * ) Notice: Subject to any disclaimer, the term of this patent is extended or adjusted under 35 U.S.C. 154(b) by 241 days.

(21) Appl. No.: 10/548,540

(22) PCT Filed: Feb. 25, 2004

(86) PCT No.: PCT/JP2004/002209

§ 371 (c)(1),
(2), (4) Date: May 22, 2006

(87) PCT Pub. No.: WO2004/082273

PCT Pub. Date: Sep. 23, 2004

(65) Prior Publication Data

US 2006/0233065 A1    Oct. 19, 2006

(30) Foreign Application Priority Data

Mar. 11, 2003   (JP)   ............................. 2003-065812

(51) Int. Cl.
*G11B 5/09* (2006.01)

(52) U.S. Cl. ...................................... 369/84; 369/47.12
(58) Field of Classification Search .................. None
See application file for complete search history.

(56) References Cited

U.S. PATENT DOCUMENTS

| 6,714,722 | B1 * | 3/2004 | Tsukidate | 386/83 |
| 6,952,521 | B2 * | 10/2005 | Kelly et al. | 386/52 |
| 2002/0141737 | A1 * | 10/2002 | Fuchigami | 386/98 |

FOREIGN PATENT DOCUMENTS

| JP | 10-79917 | 3/1998 |
| JP | 2002-171490 | 6/2002 |
| JP | 2003-199047 | 7/2003 |

* cited by examiner

*Primary Examiner*—Muhammad N. Edun
(74) *Attorney, Agent, or Firm*—Young & Thompson

(57) ABSTRACT

An information recording device includes: acquisition elements for acquiring corresponding definition information, arrival time information, and display time information from a primary recording medium; processing elements for converting the display time indicated by the display time information into a display time indicated on the same time axis according to the arrival time information and outputting the processed display time information; and recording elements for recording a second whole stream in the form of the processed display time information which has been output and added to each packet of a plurality of partial streams constituting the second whole stream on a secondary recording medium. On the primary recording medium, the arrival time information indicating the arrival time of each packet and display time information indicating the display time are recorded.

20 Claims, 23 Drawing Sheets

(a)

(b)

TS#1 Object

| | PMT | Program No | Content of ES | ES_PID |
|---|---|---|---|---|
| show1 | 100 | 1 (PG#1) | Video 1 | 101 |
| | | | Audio 1 | 102 |
| show2 | 200 | 2 (PG#2) | Video 2 | 201 |
| | | | Audio 2 | 202 |
| show3 | 300 | 3 (PG#3) | Video 3 | 301 |
| | | | Audio 3 | 302 |

FIG. 10

|  | First Recording Medium | |
|---|---|---|
|  | Title #1 | |
|  | P List #1 | |
|  | Item #1 | |
|  | TS #1 Object | |
| AU#1 { | PU#1 | Video 1 |
|  | PG#1 | Audio 1 |
|  | PU#2 | Video 2 |
|  | PG#2 | Audio 2 |
|  | PU#3 | Video 3 |
|  | PG#3 | Audio 3 |

| Field Name | | Written Content |
|---|---|---|
| Disc General Info. | | Disc Volume Info., Total Title Number, etc. |
| Title Info. table | Title Pointer | Storage Address of Title #1 Info., Other Info. about Title #1, such as Title Type |
|  | Title#1 Info. | Head P List No. of Title #1, Other Info. about this P List |
| Other Info. | | |

| Field Name | Written Content |
|---|---|
| Title Pointer | Storage Address of Title#1 Info., Max PG No. = 3, Other Info. |
| Title #1 Info. | Head P List No. = 1<br>Other Info. about this List, such as Chapter Info. |

| Field Name | | | Written Content |
|---|---|---|---|
| P List General Info. | | | P List Size, Total P List No., etc. |
| P List Pointer table | P List#1 Pointer | | P List #1 Info. Storage Address |
| P List#1 Info. table | P List #1 General Info. | | Item Total No. constituting P List#1 = 1, Other Info. |
| | P List #1 Item Info. table | Item#1 Info. | Relevant AU No. in AU table in Object Info. File, etc. |
| | Other Info. | | Command Content etc. |

126

View of Recording State Example of Head Portion Packet in File

FIG. 16

(index#1 Stream)

Record with Values on Time Axis Defined by PCR_PID(=101)

| Display Start Time | Packet No. |
|---|---|
| 5 0 | 4 |
| 1 5 0 5 0 | 1 6 |
| 3 0 0 5 0 | 3 8 |
| . . . | . . . |
| T101_1 | 1 |

(index#3 Stream)

Record with Values on Time Axis Defined by PCR_PID(=201)

| Display Start Time | Packet No. |
|---|---|
| 1 0 0 | 5 |
| 1 7 1 0 0 | 1 7 |
| 3 4 1 0 0 | 4 4 |
| . . . | . . . |
| T201_m | m |

(index#5 Stream)

Record with Values on Time Axis Defined by PCR_PID(=301)

| Display Start Time | Packet No. |
|---|---|
| 1 3 0 0 | 3 |
| 1 6 3 0 0 | 1 8 |
| 3 1 3 0 0 | 4 1 |
| . . . | . . . |
| T301_n | n |

TS#1 Object

| | PMT | Program No. | Content of ES | ES_PID |
|---|---|---|---|---|
| show1 | | | Video 1 | 101 |
| | | | Audio 1 | 102 |
| show2 | 100 | 1 (PG#1) | Video 2 | 103 |
| | | | Audio 2 | 104 |
| show3 | | | Video 3 | 105 |
| | | | Audio 3 | 106 |

FIG. 23

(index #1 Stream)

Record All Streams with Values on Time Axis Defined by PCR_PID(=101)

| Display Start Time | Packet No. |
|---|---|
| 5 0 | 4 |
| 1 5 0 5 0 | 1 6 |
| 3 0 0 5 0 | 3 8 |
| . . . | . . . |
| T101_1 | 1 |

(index #3 Stream)

| Display Start Time | Packet No. |
|---|---|
| 6 0 | 5 |
| 1 6 9 4 0 | 1 7 |
| 3 3 0 4 0 | 4 4 |
| . . . | . . . |
| T101_m | m |

(index #5 Stream)

| Display Start Time | Packet No. |
|---|---|
| 4 5 | 3 |
| 1 7 5 0 5 | 1 8 |
| 3 1 5 0 5 | 4 1 |
| . . . | . . . |
| T101_n | n |

INFORMATION RECORDING DEVICE AND METHOD, INFORMATION RECORDING MEDIUM, AND RECORDING CONTROL COMPUTER PROGRAM

TECHNICAL FIELD

The present invention relates to an information recording apparatus and method for a recording medium, such as an optical disc, on which a stream in a multi program format, such as a TS (Transport Stream) of a MPEG (Moving Picture Expert Group) standard, for example, or a stream in a single program format, such as a PS (Program Stream), is recorded. The present invention also relates to an information recording medium, such as an optical disc, on which the recording is performed by the information recording apparatus, and further relates to a computer program which makes a computer function as the information recording apparatus.

BACKGROUND ART

Conventionally, an information recording apparatus, such as an optical disc recorder, compliant with the PS of a MPEG 1 or MPEG2 standard, can reproducibly record a single program, as a program stream constructed from a plurality of elementary streams, such as a video stream, an audio stream, and a sub-picture stream (refer to Japanese Patent Application Laying Open NO. Hei 10-79917). Such an information recording apparatus has already generally become popular.

On the other hand, the inventors of the present invention and others are studying an information recording apparatus, such as an optical disc recorder, which is compliant with the TS of the MPEG standard, for recording a plurality of programs onto an optical disc or the like so that the programs can be changed, seamlessly or non-seamlessly, upon reproduction. For example, by associating a plurality of angle video images, obtained by filming the same scene from a plurality of view points, with a plurality of programs, an angle change can be performed by the program change in response to a remote control operation or the like upon reproduction.

DISCLOSURE OF INVENTION

However, depending on the conventional information recording apparatus compliant with the MPEG standard PS described above, it is difficult or practically impossible to collectively record a plurality of programs transmitted at the same time in accordance with the TS, such as digital broadcasting, for example.

On the other hand, on the optical disc on which the recording is performed in the multi program format having a plurality of time point references by the information recording apparatus compliant with the MPEG standard TS described above, reproduction cannot be performed by an information reproducing apparatus compliant with the MPEG1 or MPEG2 standard PS, which has already generally become extremely popular. In particular, if a plurality of angle video images are transmitted in a format corresponding to a plurality of programs by the digital broadcasting or the like, the information recording apparatus compliant with the MPEG standard TS described above can only record this as the plurality of programs. In other words, for example, the plurality of programs related to the angle has an extremely strong correspondence relationship, so that there are conceivably many cases where it is useful to treat them as the same or single program. However, there is a problem that it is technically difficult to record the plurality of programs as the single program. Moreover, for example, even a plurality of shows broadcasted in the same time zone have a strong correspondence relationship. Thus, there are conceivably many cases where it is useful to treat them as the same or single program. For example, if these shows can be recorded as the single program, it is possible to recreate the same environment upon reproduction thereof, as in watching them upon broadcasting by a process of changing streams in the single program. However, in practice, there is a problem that it is technically difficult to record the plurality of programs as the single program.

The present invention has been accomplished in view of the above problems, for example. It is therefore an object of the present invention to provide: an information recording apparatus and method capable of reading information which constitutes a plurality of programs from a first recording medium on which the recording is performed, for example, in the multi program format having a plurality of time point references, and capable of recording the read information as a single program onto a second recording medium in the single program format having a mutually equal time point reference; an information recording medium on which the recording is performed by the information recording apparatus; and a computer program which makes a computer function as the information recording apparatus.

Explanations will be given in order, with reference to the information recording apparatus, information recording method, information recording medium, and computer program of the present invention.

(Information Recording Apparatus)

The above object of the present invention can be achieved by an information recording apparatus for reading information from a first recording medium on which a first entire stream which has a plurality of time point references is recorded, and for recording the read information onto a second recording medium as a second entire stream which has a mutually equal time point reference, wherein (i) on the first recording medium, a plurality of portion streams, each of which is constructed from a series of content information and which constitute a plurality of programs having mutually independent time point references, are packetized and multiplexed by a unit of packet, which is a physically accessible unit and which stores therein a piece of the content information, and recorded as the first entire stream, and moreover, there are recorded correspondence definition information for defining a correspondence relationship between a plurality of packets multiplexed on a time axis and the plurality of portion streams, arrival time point information indicating an arrival time point of each packet with respect to at least one portion of the plurality of packets, and display time point information for showing a display time point of each packet on a time axis independent for each of the programs with respect to at least one portion of the plurality of packets, (ii) on the second recording medium, a plurality of portion streams constituting a single program having a mutually equal time point reference can be packetized and multiplexed by the unit of packet, and can be recorded as the second entire stream, and the information recording apparatus is provided with: an obtaining device for obtaining the plurality of packets and the correspondence definition information, the arrival time point information, and the display time point information, with respect to the plurality of packets, from the first recording medium; a processing device for converting a display time point which is shown by the obtained display time point information on mutually different time axes related to the plurality of programs, to a display time point shown on a same time axis, on the basis of the obtained arrival time point information, and for outputting processed display time point information indicating the converted display time point; and a recording device for recording the second entire stream onto the second recording medium in such a form that the outputted processed display time point information is appended to each packet in at least one portion of a plurality of packets which belong to the plurality of elementary streams which constitute the second entire stream.

According to the information recording apparatus of the present invention, on the first recording medium, such as a hard disk and an optical disc, a plurality of portion streams, such as ESs (Elementary Streams), which constitute a plurality of programs having mutually independent time point references, are packetized and multiplexed by the unit of packet, and are recorded as the first entire stream, such as a TS (Transport Stream). Moreover, on the first recording medium, there are recorded the correspondence definition information, such as an ES map table and ES_PID, or a PAT and PMT, described later, for defining a correspondence relationship between a plurality of packets and the plurality of portion streams, the arrival time point information, such as an ATS described later, indicating an arrival time point of each packet, and the display time point information, such as a PTS described later, for showing a display time point of each packet on a time axis independent for each of the programs.

On the other hand, on the second recording medium, such as an optical disc, a plurality of portion streams constituting a single program having a mutually equal time point reference can be packetized and multiplexed by the unit of packet, and can be recorded as the second entire stream, such as a PS (Program Stream).

Upon recording by the information recording apparatus, by the obtaining device, such as a hard disk drive, an optical disc drive, and a tuner, the plurality of packets and the correspondence definition information, the arrival time point information, and the display time point information, with respect to the plurality of packets, are obtained from the first recording medium. Then, by the processing device, a display time point which is shown by the obtained display time point information, and which is shown on mutually different time axes related to the plurality of programs, is converted to a display time point shown on the same time axis, on the basis of the obtained arrival time point information. The processed display time point information indicating the converted display time point is outputted from the processing device. Then, by the recording device, the second entire stream is recorded onto the second recording medium in such a form that the outputted processed display time point information is appended to each packet in at least one portion of a plurality of packets which belong to the plurality of elementary streams which constitute the second entire stream.

As described above, by the processing device of the present invention, the display time point information, such as a time stamp or a PTS, on a plurality of types of, namely, on a plurality of time axes appended for respective programs is replaced by the display time point information, such as a time stamp or a PTS, on the same type of, namely, on the same time axis, which is common in a single program, and is appended again. By this, in the second entire stream in the single program format, all the portion streams constituting this have the common time axis. In other words, the time axis on which the display time point of all the portion streams constituting the second entire stream is based is unified.

Consequently, it is possible to read information from the first recording medium on which the first entire stream which has a plurality of time point references is recorded, and to record the read information onto the second recording medium as the second entire stream which has a mutually equal time point reference. Moreover, it is possible to reproduce a plurality of content information corresponding to a plurality of programs on the first recording medium, from the second recording medium on which the second entire stream is recorded in the above manner, as a plurality of content information corresponding to a single program. Particularly at this time, it is possible to perform the reproduction change of a plurality of content information, seamlessly or non-seamlessly, such as angle change, multi view change, and multi vision change, as processing in the single program, by a stream change which is a process of changing one or a plurality of portion streams.

For example, a plurality of angle video streams broadcasted in the multi program format or recorded on the first recording medium become a plurality of angle video streams recorded on the second recording medium in the single program format having a mutually equal time reference. By this, upon reproduction of the second recording medium, it is possible to perform the angle change, not by a change between or among mutual different programs, but by the stream change in the same program. Moreover, if shows on a plurality of channels broadcasted in the same time zone are recorded on the second recording medium in the single program format, it is possible to perform a channel change as in broadcasting, by the stream change in the same program.

In one aspect of the information recording apparatus of the present invention, time point reference information indicating a time reference of the time axis for each of the programs is further recorded on the first recording medium, and the processing device converts the display time point which is shown by the obtained display time point information on the mutually different time axes related to the plurality of programs, to the display time point shown on the same time axis, on the basis of the time reference indicated by the time point reference information.

According to this aspect, upon recording, the time point reference information, such as a PCR described later, indicating a time reference of the time axis for each of the programs is obtained by the obtaining device, as well as the plurality of packets and the correspondence definition information and the like. Then, by the processing device, the display time point which is shown by the display time point information, such as a PTS described later, on the mutually different time axes related to the plurality of programs, is converted to the display time point shown on the same time axis, on the basis of the time reference indicated by the time point reference information. Thus, on the basis of the time reference indicated by the time point reference information, in the second entire stream in the single program format, all the portion streams constituting this have the common time axis.

In this aspect, it may be constructed such that the processing device converts the time point reference information to time point reference information indicating a time point reference of the same time axis, and outputs it as processed time point reference information, and the recording device further records the processed time point reference information onto the second recording medium.

By virtue of such construction, upon recording, by the processing device, the time point reference information, such as a PCR described later, is converted to time point reference information indicating a time point reference of the same time axis, and outputted as the processed time point reference information. Then, by the recording device, the processed time point reference information is recorded onto the second recording medium. Namely, the time point reference information is reconstructed for the second recording medium. Thus, upon reproduction of the second recording medium, by using the processed time point reference information, it is possible to extremely efficiently perform the reproduction change of a plurality of content information, seamlessly or non-seamlessly, such as angle change, as processing in a single program, by the stream change.

Alternatively, in another aspect of the information recording apparatus of the present invention, reference packet designation information for designating a packet including time point reference information indicating a time reference of the time axis is included on the first recording medium, and the processing device converts the display time point which is shown by the obtained display time point information on the mutually different time axes related to the plurality of programs, to the display time point shown on the same time axis, on the basis of the time reference indicated by the time point reference information which is included in the packet designated by the reference packet designation information.

According to this aspect, upon recording, the reference packet designation information, such as a PCR_PID described later, is obtained by the obtaining device, as well as the plurality of packets and the correspondence definition information and the like. Then, by the processing device, the display time point which is shown by the display time point information, such as a PTS described later, on the mutually different time axes related to the plurality of programs, is converted to the display time point shown on the same time axis, on the basis of the time reference indicated by the time point reference information, such as a PCR described later, which is included in the packet designated by the obtained reference packet designation information. Thus, on the basis of the time reference indicated by the time point reference information, in the second entire stream in the single program format, all the portion streams constituting this have the common time axis.

Incidentally, such reference packet designation information may be written in the packet of a PAT, PMT, or the like, described later. Alternatively, in addition to or in place of this, it may be written, without packetized, in the correspondence definition information, such as an ES map table described later, in the object information file, for example.

In this aspect, it may be constructed such that the processing device converts the reference packet designation information to reference packet designation information for designating a packet including time point reference information indicating a time reference of the same time axis, and outputs it as processed reference packet designation information, and the recording device further records the processed reference packet designation information onto the second recording medium.

By virtue of such construction, upon recording, by the processing device, the reference packet designation information, such as a PCR_PID described later, is converted to reference packet designation information for designating a packet including time point reference information indicating a time reference of the same time axis, and outputted as the processed time point reference information. Then, by the recording device, the processed reference packet designation information is recorded onto the second recording medium. Namely, the reference packet designation information is reconstructed for the second recording medium. Thus, upon reproduction of the second recording medium, by using the processed reference packet designation information, it is possible to extremely efficiently perform the reproduction change of a plurality of content information, seamlessly or non-seamlessly, such as angle change, as processing in a single program, by the stream change.

In another aspect of the information recording apparatus of the present invention, the processing device converts the correspondence definition information to correspondence definition information for designating a correspondence relationship between a plurality of packets multiplexed on the same time axis and the plurality of portion streams, and outputs it as processed correspondence definition information, and the recording device further records the processed correspondence definition information onto the second recording medium.

According to this aspect, upon recording, by the processing device, the correspondence definition information, such as an ES map table and ES_PID described later, is converted to correspondence definition information for designating a correspondence relationship between a plurality of packets multiplexed on the same time axis and the plurality of portion streams, and outputted as the processed correspondence definition information. Then, by the recording device, the processed correspondence definition information is recorded onto the second recording medium. Namely, the correspondence definition information is reconstructed for the second recording medium. Thus, upon reproduction of the second recording medium, by using the processed correspondence definition information, it is possible to extremely efficiently perform the reproduction change of a plurality of content information, seamlessly or non-seamlessly, such as angle change, as processing in a single program, by the stream change.

In this aspect, it may constructed such that a packet number of a head packet including a piece of the content information which starts to be displayed at the display start time point for each of the portion streams is further recorded as address information indicating an address of the packet, on the first recording medium, the processing device converts the address information, to address information of a packet corresponding to the processed correspondence definition information, and outputs processed address information, and the recording device further records the processed address information onto the second recording medium.

By virtue of such construction, upon recording, by the processing device, the address information, such as ES address information in an ES map table described later, is converted to address information of a packet corresponding to the processed correspondence definition information, and outputted as the processed address information. Then, by the recording device, the processed address information is recorded onto the second recording medium. Namely, the address information is reconstructed for the second recording medium. Thus, upon reproduction of the second recording medium, by using the processed address information, it is possible to extremely efficiently perform the reproduction change of a plurality of content information, seamlessly or non-seamlessly, such as angle change, as processing in a single program, by the stream change. Particularly in this case, the address information indicates the address of the packet, as the packet number of a head packet, such as a packet of i picture, including a piece of the content information which starts to be displayed at the display start time point. Thus, it is possible to perform such efficient reproduction while preventing an increase in the data amount necessary for the address information.

In an aspect associated with the above-mentioned processed correspondence definition information, the recording device records an object information file which stores therein at least one of the processed correspondence definition information and the processed address information and which is not packetized by the unit of packet.

By virtue of such construction, upon recording, by the recording device, the object information file which stores therein the processed correspondence definition information and the processed address information and which is not packetized is recorded onto the second recording medium. Therefore, upon reproduction of the second recording medium, by reading the object information file before reading a packet stored in the object data file, for example, it is possible to perform the subsequent reproduction processing of the content information, efficiently or easily, on the basis of the processed correspondence definition information and the processed address information.

In an aspect associated with the above-mentioned processed correspondence definition information, it may be constructed such that related group definition information for defining a group having a particular relation out of a plurality of a series of contents which constitute the plurality of portion streams as a related group is further recorded on the first recording medium, that the obtaining device further obtains the related group definition information, the processing device converts the obtained related group definition information to a related group corresponding to the processed correspondence definition information, and outputs processed related group definition information indicating the converted related group, and the recording device further records the processed related group definition information onto the second recording medium.

By virtue of such construction, the related group definition information, such as AU information described later, for defining a related group, such as an AU described later, is obtained by the obtaining device from the first recording medium. Then, by the processing device, the related group definition information is converted to a related group corresponding to the processed correspondence definition information, and the processed related group definition information is outputted. Then, by the recording device, the processed related group definition information is recorded onto the second recording medium. Therefore, upon reading from the first recording medium, it is possible to obtain the portion stream for each related group, on the basis of the related group definition information. Moreover, even upon reproduction of the second recording medium, it is possible to reproduce the portion stream for each related group, on the basis of the processed related group definition information. For example, upon the reproduction, it is possible to perform the stream change in the related group, efficiently.

In this case, moreover, it may be constructed such that sub-group definition information for defining a group of a plurality of portion streams which are mutually change-reproducible in the related group, as a sub group is further recorded on the first recording medium, the obtaining device further obtains the sub-group definition information, the processing device converts the sub-group definition information to a sub group corresponding to the processed correspondence definition information, and outputs processed sub-group definition information indicating the converted sub group, and the recording device further records the processed sub-group definition information onto the second recording medium.

By virtue of such construction, the sub-group definition information, such as PU information described later, for defining a sub group, such as a PU described later, is obtained by the obtaining device from the first recording medium. Then, by the processing device, the sub-group definition information is converted to a sub group corresponding to the processed correspondence definition information, and the processed sub-group definition information is outputted. Then, by the recording device, the processed sub-group definition information is recorded onto the second recording medium. Therefore, upon reading from the first recording medium, it is possible to obtain the portion stream for each sub group, on the basis of the sub-group definition information. Moreover, even upon reproduction of the second recording medium, it is possible to reproduce the portion stream for each sub group, on the basis of the processed sub-group definition information. For example, upon the reproduction, it is possible to perform the stream change, as the change of the sub group in the same related group, efficiently.

In this case, moreover, it may be constructed such that the related group definition information and the sub-group definition information are stored in an object information file which is not packetized by the unit of packet on the first recording medium, the obtaining device further obtains the object information file, and the recording device records a processed object information file which stores therein the processed related group definition information and the processed sub-group definition information and which is not packetized by the unit of packet onto the second recording medium.

By virtue of such construction, the object information file which is not packetized is obtained by the obtaining device from the first recording medium. Then, by the recording device, the processed object information file which stores therein the processed related group definition information and the processed sub-group definition information and which is not packetized is recorded onto the second recording medium. Therefore, upon reading from the first recording medium, firstly, by obtaining the object information file which is not packetized, it is possible to obtain the portion stream for each related group or for each sub group, on the basis of the related group definition information and the sub-group definition information. Moreover, even upon reproduction of the second recording medium, firstly, by obtaining the object information file which is not packetized, it is possible to subsequently reproduce the portion stream for each related group or for each sub group, on the basis of the processed related group definition information and the processed sub-group definition information. For example, upon the reproduction, it is possible to perform the stream change, as the change of the sub group in the same related group, efficiently.

In another aspect of the information recording apparatus of the present invention, the obtaining device extracts a packet to be recorded onto the second recording medium, from the plurality of packets recorded on the first recording medium in accordance with a set recording condition, and the processing device processes the extracted packet.

By virtue of such construction, it is not necessary to process all the packets, but it is enough to process the packet extracted as it is to be recorded onto the second recording medium. Thus, it is possible to perform the processing by the processing device, easily and quickly. For example, if it is unnecessary to record one or more programs, out of the plurality of programs recorded on the first recording medium, in accordance with a command indicating the fact, issued by a remote control operation or the like, a packet related to the program which is not required to be recorded may be not obtained or may be discarded before or after the obtainment.

In another aspect of the information recording apparatus of the present invention, the first recording medium is a hard disk and the second recording medium is an optical disc, the obtaining device includes a hard disk drive apparatus capable of performing reading on the hard disk, and the recording device includes an optical disc drive apparatus capable of performing writing on the optical disc.

According to this aspect, it is possible to record the first entire stream which is recorded in the multi program format on the hard disk, onto the optical disc, as the second entire stream, in the single program format. For example, it is possible to temporarily record digital broadcasting compliant with the TS onto the hard disk, and then record all or part of the recording onto the optical disc. At this time, the optical disc may be what is compliant with a traditional PS, so that it is extremely useful, in practice.

In another aspect of the information recording apparatus of the present invention, each of the arrival time point and the display time point is represented by a count value counted by a same or different clock, and the processing device converts a count value related to the obtained display time point information to a count value shown on the same time axis, on the basis of a count value related to the obtained arrival time point information, to thereby output the processed display time point information.

According to this aspect, by the processing device, a count value indicating the display time, such as a PTS described later, is converted to a count value shown on the same time axis, on the basis of a count value indicating the arrival time point, such as an ATS described later, to thereby output the processed display time point information. As described above, by using the processing with respect to the count value, it is possible to reconstruct the display time point for the second recording medium, extremely efficiently.

In another aspect of the information recording apparatus of the present invention, the correspondence definition information is packetized and multiplexed by the unit of packet on the first recording medium, and the recording device records the correspondence definition information packetized by the unit of packet, onto the second recording medium, in a state of being packetized by the unit of packet.

According to this aspect, the correspondence definition information, such as a PAT and PMT described later, which is packetized and recorded on the first recording medium, is recorded by the recording device onto the second recording medium, in a state of being packetized.

Incidentally, as described above, if the correspondence definition information, such as a PAT and PMT, is packetized and recorded, it is possible to perform the reading and reproduction of the first recording medium or the second recording medium even if the related group information and the sub-group information, such as an AU and PU described later, and moreover, the correspondence definition information, such as an ES map table and ES_PID described later, are not recorded in the object information file. In other words, in this case, if the PAT and PMT are sequentially reproduced upon reading and reproduction (although it increases the load and time of the processing more or less), it is possible to understand a correspondence relationship between the packet and the portion stream.

In another aspect of the information recording apparatus of the present invention, the correspondence definition information is stored in an object information file which is not packetized by the unit of packet on the first recording medium, and the obtaining device collectively obtains the correspondence definition information from the object information file which is not packetized.

According to this aspect, the correspondence definition information, such as an ES map table and ES_PID described later, stored in the object information file which is not packetized on the first recording medium is collectively obtained by the obtaining device. Thus, by using the correspondence definition information, it is possible to subsequently obtain the packet, efficiently.

Incidentally, if the packetized content information or the packetized object data is read and reproduced by using not only the correspondence definition information, but also the AU, the PU, and the like described later which are stored in the object information file which is not packetized, it is possible to perform it, substantially efficiently.

In another aspect of the information recording apparatus of the present invention, the plurality of packets include a packet including a portion which stores therein the arrival time point information and a packet payload which stores therein a piece of the content information, and the obtaining device obtains the arrival time point information from the packet.

According to this aspect, upon recording, the arrival time point information is obtained by the obtaining device, from the packet including a portion which stores therein the arrival time point information and a packet payload which stores therein a piece of the content information. Then, the conversion processing by the processing device is performed, on the basis of the arrival time point information obtained in this manner. Therefore, the conversion processing can be performed properly, at each time the arrival time point information is included in the packet. Alternatively, it is efficient to perform the conversion processing, in accordance with the degree that the arrival time point information is included in the packet.

Incidentally, the above-discussed information recording apparatus may be constructed as a part of an information recording / reproducing apparatus, such as an optical disc recorder of a hard disk built-in type.

(Information Recording Method)

The above object of the present invention can be also achieved by an information recording method of reading information from a first recording medium on which a first entire stream which has a plurality of time point references is recorded, and of recording the read information onto a second recording medium as a second entire stream which has a mutually equal time point reference, wherein (i) on the first recording medium, a plurality of portion streams, each of which is constructed from a series of content information and which constitute a plurality of programs having mutually independent time point references, are packetized and multiplexed by a unit of packet, which is a physically accessible unit and which stores therein a piece of the content information, and recorded as the first entire stream, and moreover, there are recorded correspondence definition information for defining a correspondence relationship between a plurality of packets multiplexed on a time axis and the plurality of portion streams, arrival time point information indicating an arrival time point of each packet with respect to at least one portion of the plurality of packets, and display time point information for showing a display time point of each packet on a time axis independent for each of the programs with respect to at least one portion of the plurality of packets, (ii) on the second recording medium, a plurality of portion streams constituting a single program having a mutually equal time point reference can be packetized and multiplexed by the unit of packet, and can be recorded as the second entire stream, and the information recording method is provided with: an obtaining process of obtaining the plurality of packets and the correspondence definition information, the arrival time point information, and the display time point information, with respect to the plurality of packets, from the first recording medium; a processing process of converting a display time point which is shown by the obtained display time point information on mutually different time axes related to the plurality of programs, to a display time point shown on a same time axis, on the basis of the obtained arrival time point information, and of outputting processed display time point information indicating the converted display time point; and a recording process of recording the second entire stream onto the second recording medium in such a form that the outputted processed display time point information is appended to each packet in at least one portion of a plurality of packets which belong to the plurality of elementary streams which constitute the second entire stream.

According to the information recording method of the present invention, as in the case of the above-mentioned information recording apparatus of the present invention, it is possible to read information from the first recording medium on which the first entire stream which has a plurality of time point references is recorded, and to record the read information onto the second recording medium as the second entire stream which has a mutually equal time point reference. Moreover, it is possible to reproduce a plurality of content information corresponding to a plurality of programs on the first recording medium, from the second recording medium on which the second entire stream is recorded in the above manner, as a plurality of content information corresponding to a single program. Particularly at this time, it is possible to perform the reproduction change of a plurality of content information, seamlessly or non-seamlessly, such as angle change, multi view change, and multi vision change, as processing in the single program, by a stream change which is a process of changing one or a plurality of portion streams.

Incidentally, the information recording method of the present invention can also adopt various aspects in response to various aspects of the above-mentioned information recording apparatus of the present invention.

(Information Recording Medium)

The above object of the present invention can be also achieved by an information recording medium on which recording is performed as the second recording medium by the above-mentioned information recording apparatus of the present invention (including its various aspects), and on which a plurality of portion streams constituting a single program having a mutually equal time point reference are packetized and multiplexed by the unit of packet, and are recorded as the second entire stream.

According to the information recording medium of the present invention, the recording is performed by the above-mentioned information recording apparatus of the present invention. Thus, upon reproduction, it is possible to reproduce a plurality of content information corresponding to a plurality of programs on the first recording medium, from the second recording medium on which the second entire stream is recorded in the above manner, as a plurality of content information corresponding to a single program. Particularly at this time, it is possible to perform the reproduction change of a plurality of content information, seamlessly or non-seamlessly, such as angle change, multi view change, and multi vision change, as processing in the single program, by a stream change which is a process of changing one or a plurality of portion streams.

(Computer Program)

The above object of the present invention can be also achieved by a computer program for recording control to control a computer disposed at the above-mentioned information recording apparatus of the present invention (including its various aspects), the program making the computer function as at least a part of the obtaining device, the processing device, and the recording device.

According to the computer program for recording control of the invention, the information recording apparatus according to the present invention mentioned above may be realized relatively easily, by reading and running the computer program from a recording medium, such as a ROM, a CD-ROM, a DVD-ROM, a hard disk and so on, storing the computer program therein/thereon, or by downloading the computer program to the computer via the communication device and running it.

The above object of the present invention can be also achieved by a computer program product for recording control in a computer-readable medium for tangibly embodying a program of instructions executable by a computer disposed at the above-mentioned information recording apparatus according to the present invention (including various aspects), the program making the computer function as at least a part of the obtaining device, the processing device, and the recording device.

According to the computer program product for the recording control of the invention, at least a part of the obtaining device, the processing device, and the recording device according to the present invention mentioned above may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it. More specifically, the computer program product may be made of computer readable codes (or computer readable commands) to make the computer function as at least a part of the obtaining device, the processing device, and the recording device.

These effects and other advantages of the present invention become more apparent from the following embodiments and examples.

BRIEF DESCRIPTION OF DRAWINGS

FIG. 10 is a structural diagram schematically showing the data structure of the TS object, constructed on the first recording medium in the embodiment.

FIG. 11 is a structural diagram schematically showing one specific example of a data structure in a disc information file, in one specific example of the embodiment.

FIG. 12 is a structural diagram schematically showing one specific example of a data structure in a title information table included in the disc information file, in one specific example of the embodiment.

FIG. 13 is a structural diagram schematically showing one specific example of a data structure in a play list information table constructed in a play list information file, in one specific example of the embodiment.

FIG. 16 is a conceptual view showing a specific example of ES address information before conversion, in each video stream of a show #1, a show #2, and a show #3 in the embodiment.

FIG. 23 is a conceptual view showing a specific example of ES address information after conversion, in each video stream of the show #1, the show #2, and the show #3 in the embodiment.

BEST MODE FOR CARRYING OUT THE INVENTION (Information Recording Medium)

With reference to FIG. 1 to FIG. 7, an explanation will be given to an embodiment of a first recording medium which is an information recording medium used by an information recording apparatus according to the present invention, as the information source of information to be recorded, and a second recording medium which is an information recording medium onto which the information is recorded. Onto the first recording medium, a transport stream in the multi program format discussed below (refer to FIG. 2(b)) is recorded, which is one example of the "first entire stream in the multi program format" in the present invention. The first recording medium includes various recording media, such as an optical disc, a hard disk, a magnetic disk, and a RAM (Random Access Memory), of a type capable of recording (writing) and reproducing (reading). On the other hand, onto the second recording medium, a transport stream in the single program format (refer to FIG. 2(b)) is recorded, which is one example of the "second entire stream in the single program format" in the present invention. The second recording medium includes various recording media, such as an optical disc, a hard disk, a magnetic disk, and a RAM, of a type capable of recording and reproducing.

Incidentally, with respect to the second recording medium, in a simple case, a program stream discussed below (refer to FIG. 2(a)) may be recorded, which is in a "single video format", namely, which includes only one video stream, out of the single program format.

Therefore, the embodiment of an optical disc discussed below (refer to FIG. 1) is an embodiment of each of the first and second recording media in the present invention. Incidentally, in a preferred embodiment, as described later, the first recording medium is a hard disk and the second recording medium is an optical disc. In other words, in this case, the first recording medium is a hard disk for collectively recording digital broadcasting which simultaneously transmits a plurality of programs, for example, and the embodiment of an optical disc discussed below (refer to FIG. 1) is an embodiment of the second recording medium in the present invention.

Figure 1:
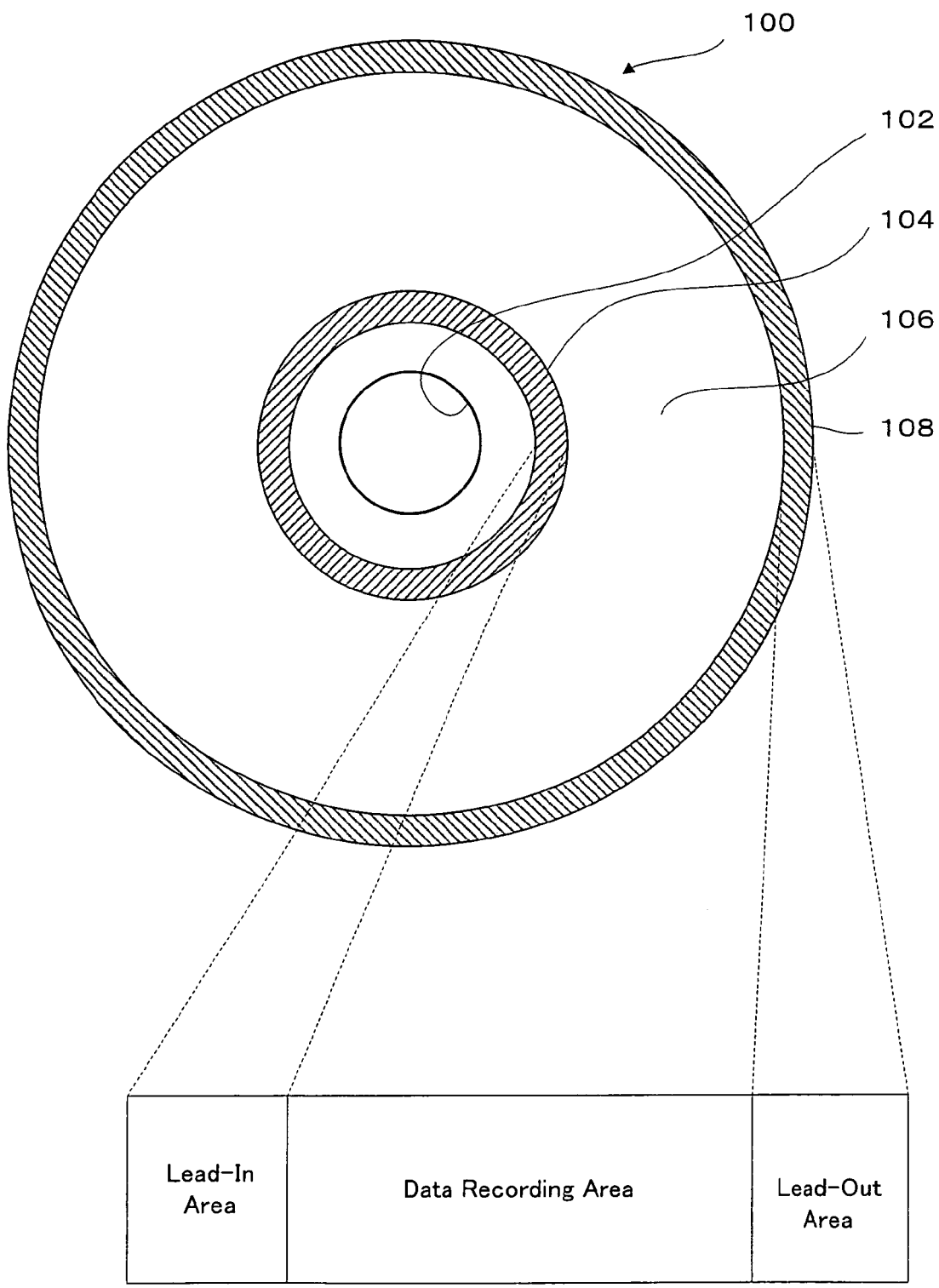
FIG. 1 is a diagram showing a basic structure of an optical disc as being one embodiment of an information recording medium of the present invention, the upper part being a schematic plan view of the optical disc having a plurality of areas, the corresponding bottom part being a schematic conceptual view of the area structure in the radial direction.

Firstly, with reference to FIG. 1, the basic structure of the optical disc in the embodiment is discussed. FIG. 1 illustrates, in its upper part, the optical disc structure having a plurality of areas in a schematic plan view, and illustrates conceptually, in its lower part, an area structure in the radius direction corresponding to the upper part.

As shown in FIG. 1, an optical disc 100 may be recorded by various recording methods, such as a magneto-optical method and a phase change method, capable of recording (writing) only once or a plurality of times. Similarly to DVDs, the optical disc 100 has a lead-in area 104, a data area 106 and a lead-out area 107, from the inner circumference around a center hole 102 to the outer circumference, on the recording surface of the disc body measuring about 12 cm in diameter. In each area, groove tracks and land tracks may be alternately arranged, concentrically or spirally, around the center hole 102. The groove tracks may be wobbled. Furthermore, pre-pits may be formed on one or both of these tracks. Incidentally, the present invention is not exclusively limited to the optical disc having three areas mentioned above.

Next, with reference to FIG. 2, the structure of the transport stream (TS) to be recorded onto the optical disc, hard disk, or the like, as being the first or second recording medium in the embodiment will be discussed. FIG. 2(a) schematically illustrates a MPEG2 program stream structure in a conventional DVD, which is in the single program format and furthermore, in the "single video format". FIG. 2(b) schematically illustrates a MPEG2 transport stream (TS) structure, which is recorded onto the optical disc as being the second recording medium or the hard disk as being the first recording medium, for example, in the embodiment.

Hereinafter, the explanation goes on with the "optical disc 100" as a representative of various recording media, such as the optical disc 100 shown in FIG. 1 and a not-illustrated hard disk, magnetic disk, RAM, and the like, on which various content information, such as video information and audio information, is recorded in the multi program format or single program format and in the transport stream format shown in FIG. 2(b).

In other words, if not otherwise specified, the explanation goes on with the "optical disc 100" as a representative, however, the transport stream in the multi program format shown in FIG. 2(b) or in the single program format may be recorded as, for example, an object data file discussed later onto a recording medium, such as a hard disk, other than the optical disc 100. In this case, moreover, various control information for reproduction control in the transport stream may be recorded as, for example, a file system, disc information file, play list information file, object information file, and the like discussed later, onto a recording medium, such as a hard disk, other than the optical disc 100. In addition, the program stream in the single program format, and moreover, in the single video format, as shown in FIG. 2(a), may be recorded onto a recording medium, such as a hard disk, other than the optical disc 100, as being the second recording medium in the embodiment. In this case, moreover, various control information for reproduction control in the program stream may be recorded onto a recording medium, such as a hard disk, other than the optical disc 100.

In FIG. 2(a), one program stream includes only one video stream for video data as main picture information or video information, along a time axis t, and further includes up to at most 7 audio streams for audio data as audio information, and up to at most 32 sub-picture streams for sub-picture data as sub-picture information. That is, the video data to be multiplexed at an arbitrary time point tx relates to only one video stream. For example, a plurality of video streams corresponding to a plurality of TV shows or a plurality of movies can not be included at the same time in the program stream. It is not possible to multiplex a plurality of TV shows and transfer or record them in the program stream format of a DVD having only one video stream, because at least one video stream is required for each TV show, in order to transfer or record the multiplexed TV show or the like involving a video image.

In FIG. 2(b), one transport stream (TS) includes a plurality of video streams as elementary streams (ES) for video data as video information, and further includes a plurality of audio streams as elementary streams (ES) for audio data as audio information and a plurality of sub-picture streams as elementary streams (ES) for sub-picture as sub-picture information. That is, the video data to be multiplexed at an arbitrary time point tx relates to a plurality of video streams. For example, a plurality of video streams that may correspond to a plurality of TV shows or a plurality of movies can be included at the same time into the transport stream. Thus, it is possible to multiplex a plurality of TV shows and transfer or record them in the transport stream format having a plurality of video streams. However, the sub-picture stream is not transferred in digital broadcasting employing the existing transport stream.

Incidentally, for convenience of explanation, the video stream, the audio stream and the sub-picture stream are arranged in this order from the top in FIG. 2(a) and FIG. 2(b). Nevertheless, this order or sequence does not correspond to an order or sequence for multiplexing the streams by a packet unit as mentioned below. In the transport stream, conceptually, a set of one video stream, two audio streams and two sub-picture streams corresponds to one program, for example.

The above-mentioned optical disc 100 in the embodiment is constructed to multiplex and record the transport stream (TS) including a plurality of elementary streams (ES) within a limit of a recording rate; namely, to record a plurality of shows or programs at the same time.

Figure 3:
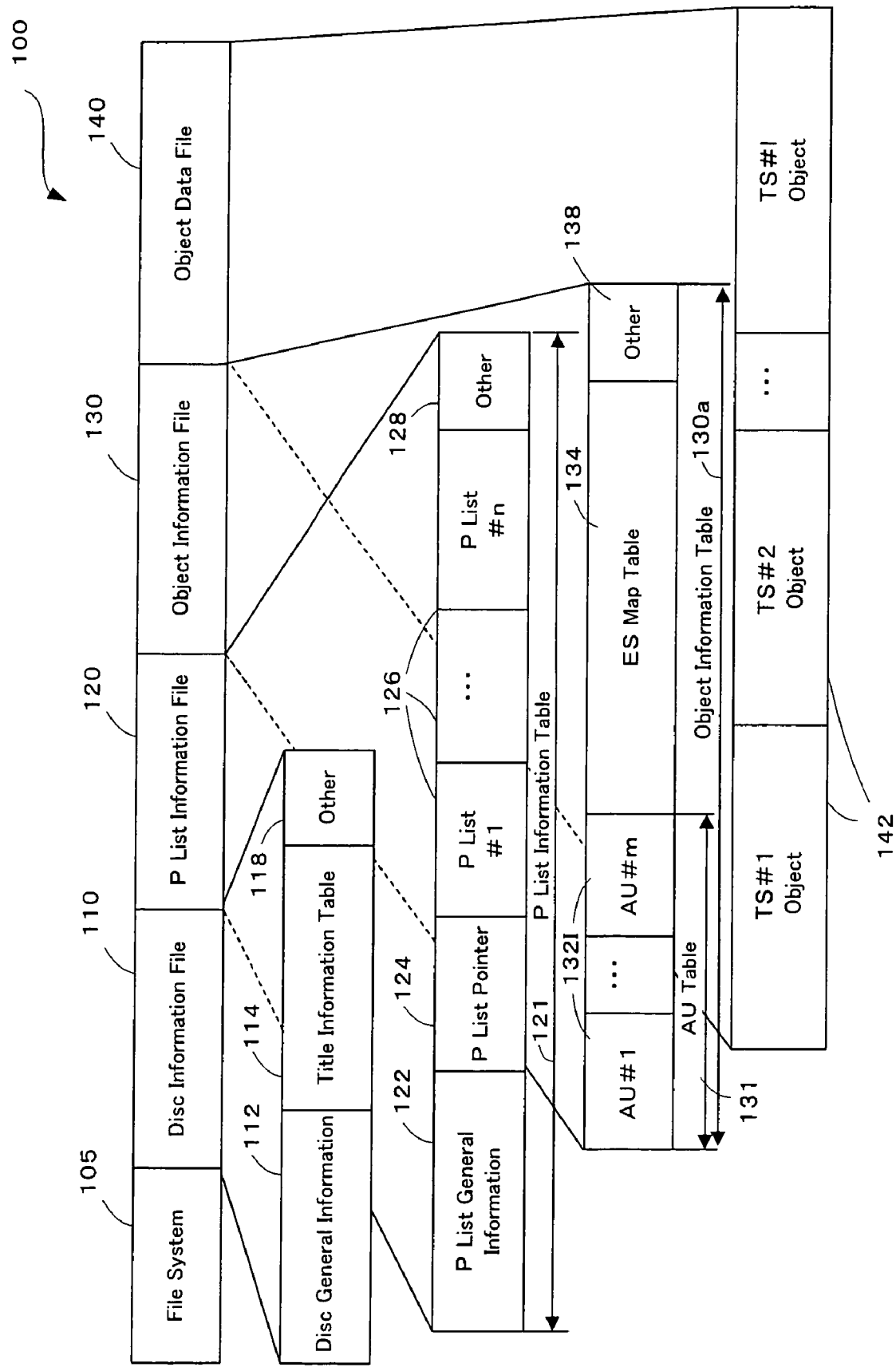
FIG. 3 is a structural diagram schematically showing a data structure recorded onto the optical disc or a hard disk in the embodiment.
Figure 4:
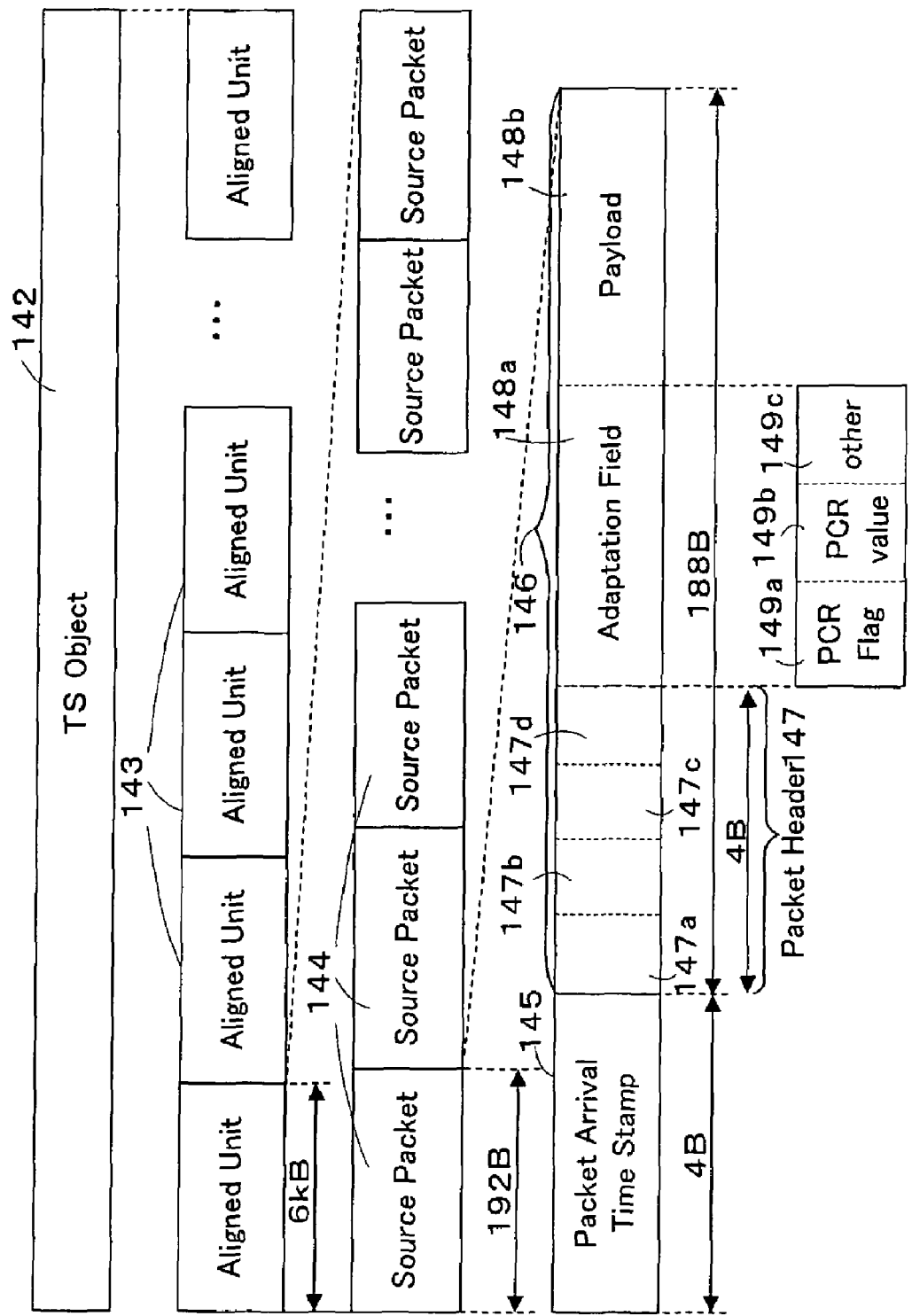
FIG. 4 is a structural diagram schematically illustrating a detailed data structure in each object shown in FIG. 3.

Next, with reference to FIG. 3 and FIG. 4, a structure of data to be recorded onto the optical disc 100 is discussed. FIG. 3 schematically shows a data structure recorded onto the optical disc 100. FIG. 4 schematically illustrates a detailed data structure in each TS object shown in FIG. 3.

In the following explanation, the "title" means a reproduction unit, on the basis of which a plurality of "play lists" are executed continuously or sequentially, and which is a logically large grouped unit, such as one movie or one TV show. The "play list" is a file for storing the information required to reproduce the "object" and consists of a plurality of "items" each storing the information about a reproduction range of the object to access the object. More specifically, in each item, "in-point information" for indicating the start address of the object and "out-point information" for indicating the end address of the object are recorded. Incidentally, each of these "in-point information" and "out-point information" may indicate the address, directly or indirectly, as a time length or time point on the reproduction time axis. The "object" is the entity information of content constituting the aforementioned MPEG2 transport stream, for example.

In FIG. 3, the optical disc 100 is provided with four files as a logical structure: a disc information file 110; a play list (P list) information file 120; an object information file 130; and an object data file 140. The disc 100 is further provided with a file system 105 for managing these files. Incidentally, although FIG. 3 does not show directly the physical data arrangement on the optical disc 100, it is possible to perform the recording in such a manner that the arrangement shown in FIG. 3 corresponds to another arrangement shown on the optical disc 100 in FIG. 1. That is, it is possible to record the file system 105 or the like into the data record area 106 following the lead-in area 104 and further record the object data file 140 or the like into the data record area 106. The file structure shown in FIG. 3 can be constructed, even without the lead-in area 104 or the lead-out area 107 shown in FIG. 1.

The disc information file 110 is a file for storing general information about the entire optical disc 100, and stores disc general information 112, title information table 114 and other information 117. The disc general information 112 may store the total number of titles or the like in the optical disc 100. The title information table 114 stores therein each title type (e.g. sequential reproduction type, branch type and so on), or the play list (P list) number constructing each title, as the logical information.

The play list information file 120 stores a play list (P list) information table 121 indicating the logical structure of each play list. This table 121 is divided into play list (P list) general information 122, play list (P list) pointer 124, a plurality of play lists (P lists) 126 (P list #1-#n), and other information 127. In this play list information table 121, the logical information of each play list 126 is stored in the order of the play list number. In other words, the order for storing the each play list 126 is the play list numbers. Furthermore, in the aforementioned title information table 114, the same play list 126 can be referred to from a plurality of titles. That is, the play list #p in the play list information table 121 may be pointed on the title information table 114, even in the case that title #n and title #m use the same play list #p.

The object information file 130 stores therein a storage position (i.e. the logical address of the reproduction object) in the object data file 140 for each item constructed in each play list 126, and/or various attribute information relating to the reproduction of the item. Particularly in this embodiment, the object information file 130 stores an AU table 131 including a plurality of AU (Associate Unit) information 1321 (AU #1-#m) indicating a plurality of related groups, as mentioned below in detail, an ES (Elementary Stream) map table 134 and other information 137.

The object data file 140 stores a plurality of TS objects 142 for each transport stream (TS) (TS#1 object-TS #1 object), i.e. a plurality of entity data of content to be actually reproduced.

Incidentally, the four kinds of files discussed with reference to FIG. 3 can be further divided into a plurality of files respectively to be stored. All these files may be managed by the file system 105. For example, the object data file 140 can be divided into a plurality of files, such as object data file #1, object data file #2 and so on.

As shown in FIG. 4, the TS object 142 shown in FIG. 3, as a logically reproducible unit, may be divided into a plurality of aligned units 143 each having a data amount of 6 kB, for example. The head of the aligned units 143 is aligned with the head of the TS object 142. Each aligned unit 143 is further divided into a plurality of source packets 144 each having a data amount of 192B. The source packet 144 is a physically reproducible unit, on the basis of which (i.e. by the unit of packet) at least the video data, the audio data and the sub-picture data from among the data on the optical disc 100 are multiplexed, and other information may be multiplexed in the same manner. Each source packet 144 has an amount of fixed-length data of 192 Bytes, and includes a packet arrival time stamp 145 having an amount of fixed-length data of 4 Bytes and a TS packet 146 having an amount of fixed-length data of 177 Byts. The packet arrival time stamp 145 is specifically time information indicating a time point at which the TS packets 146, multiplexed in the transport stream (TS) during broadcasting, arrive at a decoder (hereinafter referred to an "arrival time", as occasion demands). In other words, in the embodiment, one example of the "arrival time point information" in the embodiment is constructed from the packet arrival time stamp (packet ATS) 145.

In the TS packet 146, the video data may be packetized as "video packet", the audio data may be packetized as "audio packet", or the sub-picture data may be packetized as "sub-picture packet", otherwise other data may be packetized.

The TS packet 146 has a packet header 147 having a fixed length of 4 Bytes at the head portion thereof and a payload 147*b* at the tail portion thereof in addition to or in place of an adaptation field 147*a*.

The packet header 147 includes: a packet ID (hereinafter, referred to as an "ES_PID", as occasion demands) 147*a* discussed below; a payload start indicator 147*b*; adaptation filed control information 147*c*; and other information 147d.

The packet ID (ES_PID) 147*a* is the identification number of the TS packet 146 for each elementary stream, as described later.

The payload start indicator 147*b* is identification information indicating that a new PES packet starts from the payload 147*b* of the TS packet 146.

The adaptation filed control information 147*c* is identification information indicating whether or not there is the adaptation field 147*a* and the payload 147*b* in the TS packet 146. In other words, in the embodiment, as the TS packet 146, there are a packet including both the adaptation field 147*a* and the payload 147*b* and a packet including only one of them. The distinction of the packets is indicated by the adaptation filed control information 147*c*.

The other information 147d is other information indicating an 7-bit synchronous signal or the like.

On the other hand, the adaptation field 147 includes a PCR flag 149*a* ; a PCR value 149*b* ; and other information 149*c*.

The PCR flag 149*a* is identification information indicating whether or not the PCR value 149*b* is written in the adaptation field 147*a*.

The PCR value 149*b* constitutes one example of the "time point reference information" in the present invention, and is numerical value information indicating a program time point reference value (PCR: Program Clock Reference). More specifically, as described later, the PCR is time information for setting and calibrating a time point reference value on a decoder to a time point reference value designed on a coder. Then, in the embodiment, the PCR defines the time point reference of a time axis for each show or each program.

The other information 149*c* is other information indicating stuffing byte or the like.

The payload 147*b* is effective data information. More specifically, the payload 147*b* in a plurality of TS packets 146 having the same packet ID (ES_PID), obtained by dividing the PES packet, stores therein the effective data information.

Figure 2:
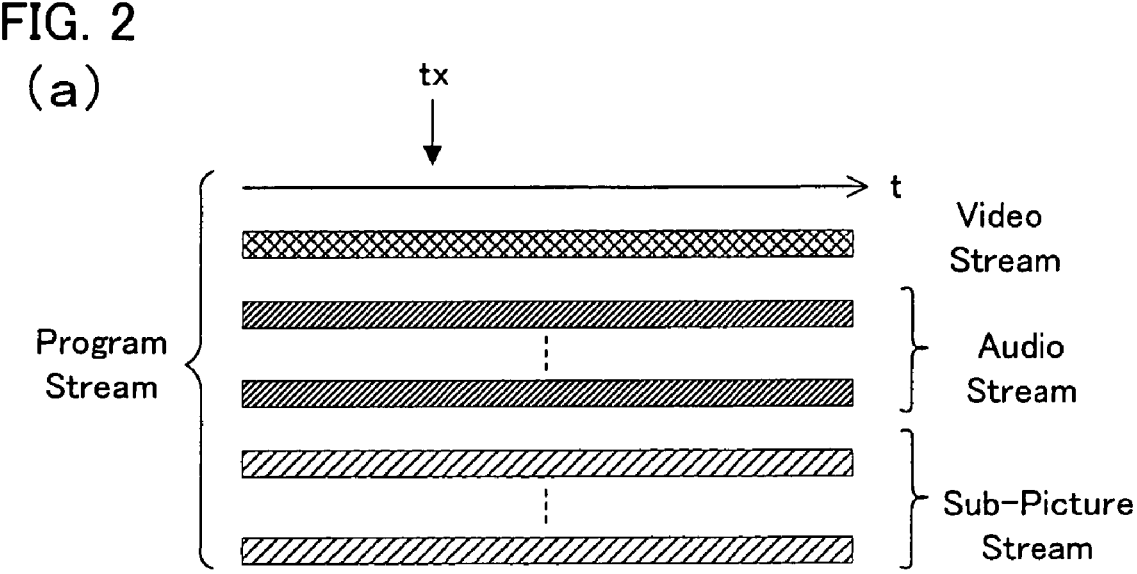
FIG. 2 are a schematic conceptual view (FIG. 2(a)) of a conventional program stream of MPEG2 ; and a schematic conceptual view (FIG. 2(b)) of a transport stream of MPEG2 used in the embodiment.
Figure 2:
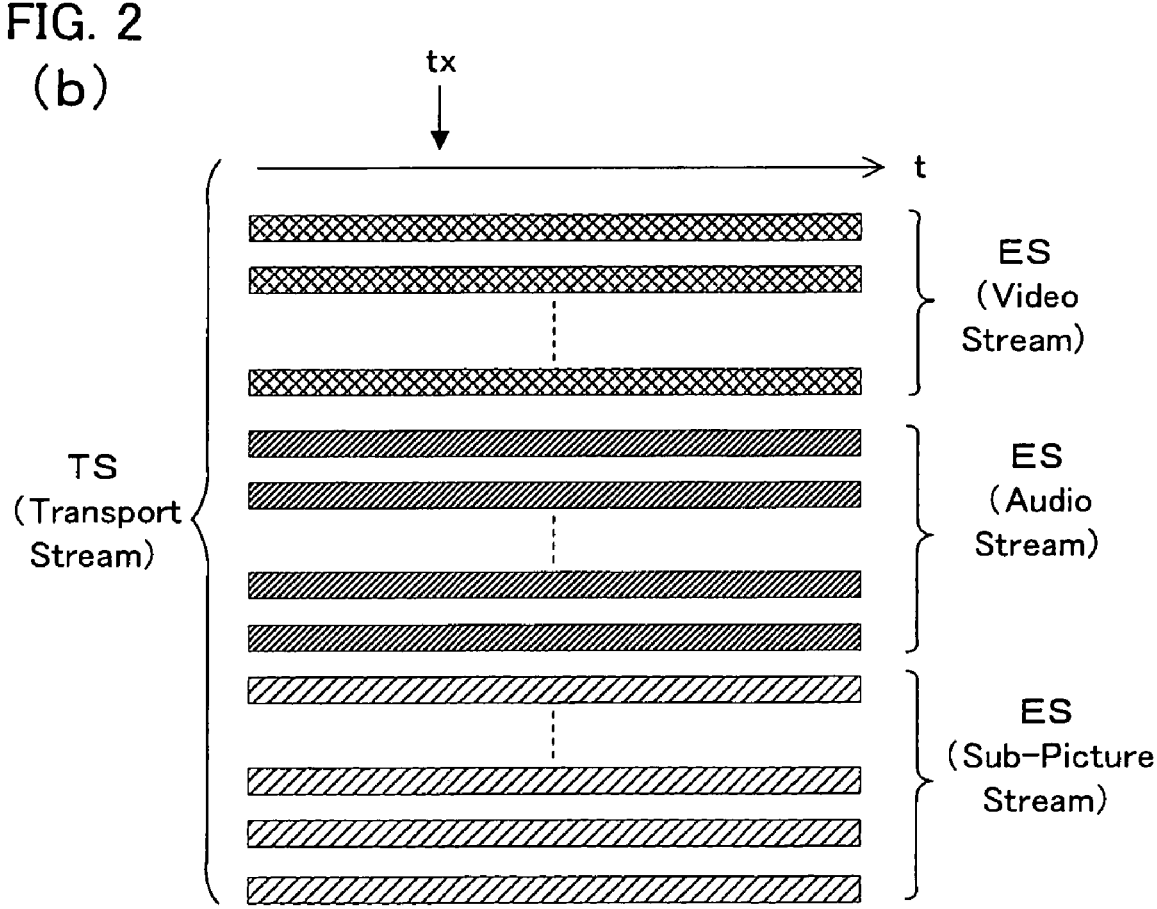
Figure 5:
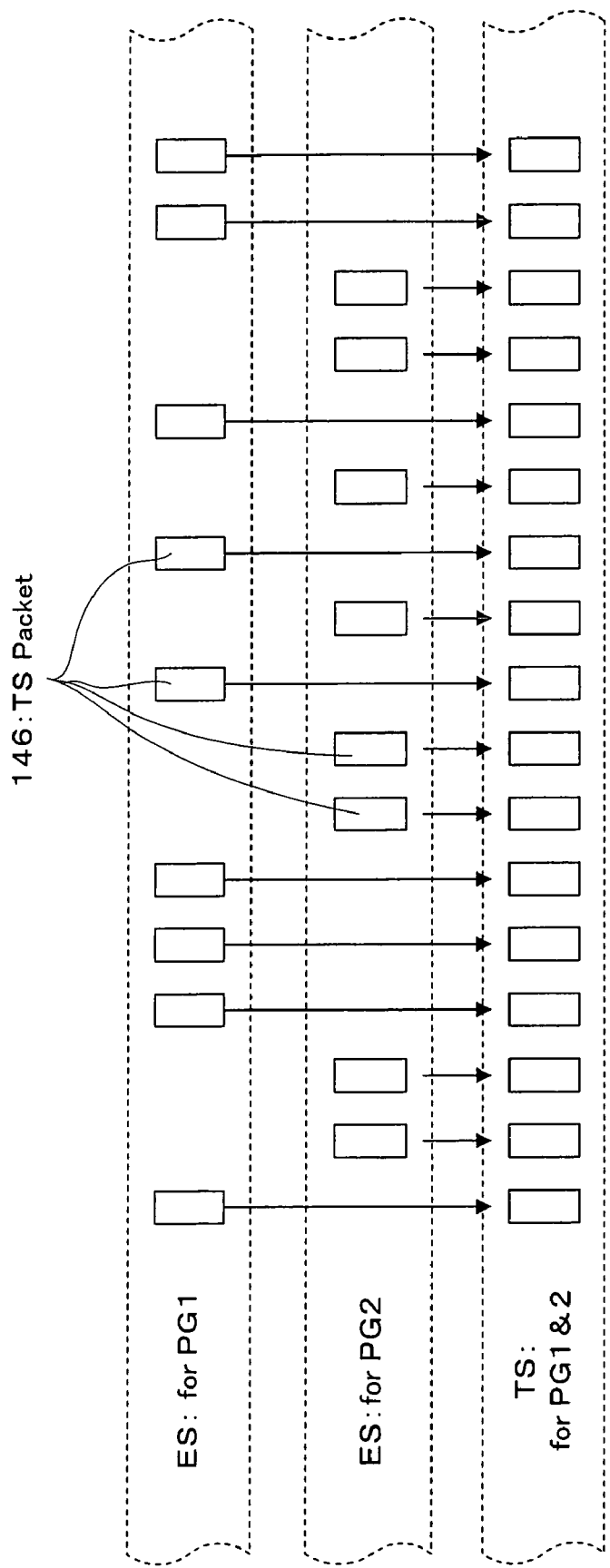
FIG. 5 is a conceptual view schematically illustrating a situation that an elementary stream for a program #1, shown at the top, and an elementary stream for a program #2, shown in the middle, are multiplexed to form a transport stream for these two programs, on the basis of a time axis in a horizontal direction.
Figure 6:
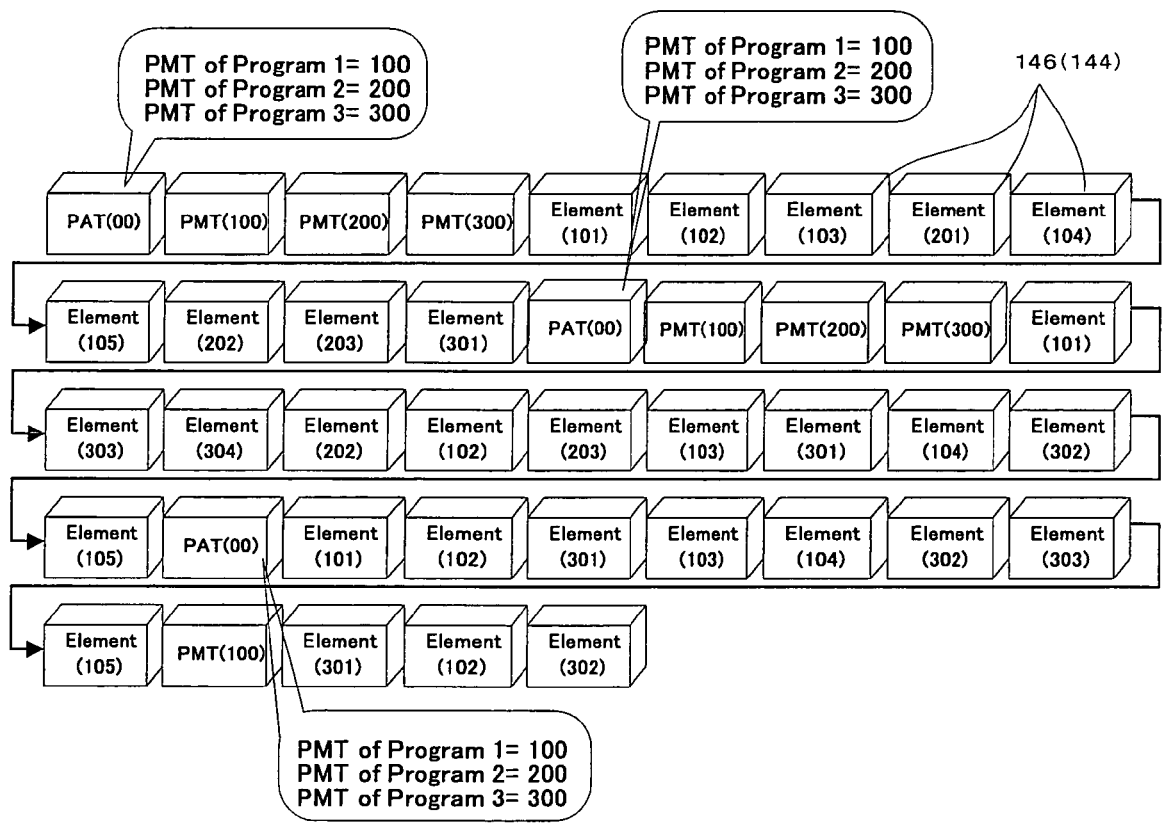
FIG. 6 is a conceptual view conceptually illustrating an image of TS packets multiplexed in one transport stream in the embodiment, as a packet arrangement based on the time axis.

Next, with reference to FIG. 5 and FIG. 6, an explanation is given on such a point that the video data, the audio data, the sub-picture data and the like in the transport stream format, as shown in FIG. 2(*b*), are multiplexed and recorded onto the optical disc 100, by the TS packet 146 shown in FIG. 4. FIG. 5 conceptually illustrates a situation that an elementary stream (ES) for a program #1 (PG1), shown at the top, and an elementary stream (ES) for a program #2 (PG2), shown in the middle, are multiplexed to form a transport stream (TS) for these two programs (PG1&2), on the basis of a time axis in a horizontal direction. FIG. 6 conceptually illustrates an image of the TS packets multiplexed in one transport stream (TS), as a packet array along the time.

As shown in FIG. 5, the elementary stream for the program #1 (at the top) may be formed by discretely arranging TS packets 146, obtained by packetizing the video data for the program #1, along the time axis (the horizontal axis). The elementary stream for the program #2 (in the middle) may be formed by discretely arranging TS packets 146, obtained by packetizing the video data for the program #2, along the time axis (the horizontal axis). Then, these TS packets 146 are multiplexed, so that the transport stream (at the bottom) for the two programs is made. Incidentally, this is omitted for convenience of explanation in FIG. 5, but in fact, as the elementary stream for the program #1, the elementary stream made of TS packets obtained by packetizing the audio data and the sub-picture stream made of TS packets obtained by packetizing the sub-picture data may be also multiplexed similarly, as shown in FIG. 2(*b*). In addition to this, as the elementary stream for the program #2, the elementary stream made of TS packets obtained by packetizing the audio data and the sub-picture stream made of TS packets obtained by packetizing the sub-picture data may be also multiplexed similarly.

As shown in FIG. 6, in this embodiment, a plurality of TS packets 146 multiplexed in this manner forms one TS stream. Then, the plurality of TS packets 146 in the multiplexed form are multiplexed and recorded onto the optical disc 100, with the information such as the packet arrival time stamp 145 being appended. Incidentally, in FIG. 6, the TS packet 146 consisting of the data forming program #i (i=1, 2, 3) is indicated by "Element (i0j)", wherein, j(j=1, 2, . . . ) is a sequential number for each stream constituting the program. This (i0j) is defined as a packet ID which is an identification number of the TS packet 146 for each elementary stream. This packet ID is fixed at an inherent value for a plurality of TS packets 146 to be multiplexed at the same time point, so that the plurality of TS packets 146 are distinguished from each other even if multiplexed at the same time point.

Furthermore, in FIG. 6, a PAT (Program Association Table) and PMTs (Program Map Tables) are also packetized by the TS packet 146 unit and multiplexed. The PAT among them stores a table indicating a plurality of PMT packet IDs. Particularly, the PAT is defined by MPEG2 standard so that (000) is given as a predetermined packet ID, as shown in FIG. 6. That is, from among a plurality of packets multiplexed at the same time point, the TS packet 146 obtained by packetizing the PAT is detected, as the TS packet 146 whose packet ID is (000). The PMT stores a table indicating the packet ID for each elementary stream forming each program in one or more programs. Any packet ID can be given to the PMTs, however, their packet IDs are indicated by the PAT detectable with the packet ID (000) as mentioned above. Therefore, among a plurality of TS packets multiplexed at the same time point, the TS packets 146 obtained by packetizing the PMTs (i.e. TS packets 146 to which packet IDs (100), (200) and (300) are given in FIG. 6) are detected on the basis of the PAT.

In the case that the transport stream as shown in FIG. 6 is transferred digitally, the tuner refers to the PAT and the PMT constructed in this manner and thereby extracts the multiplexed TS packets corresponding to the desired elementary stream and decodes the extracted packets.

In this embodiment, these PAT and PMT are included as the TS packets 146 to be stored in the TS object 142 shown in FIG. 4. That is, when the transport stream as shown in FIG. 6 is transferred, the transferred stream can be directly recorded onto the optical disc 100, which is a great advantage.

Furthermore in this embodiment, these PAT and PMT recorded in this manner are not referred to upon reproduction of the optical disc 100. Instead, referring to the AU table 131 and the ES map table 134, shown in FIG. 3 and mentioned in detail later, makes it possible to perform the reproduction more effectively and apply to the complicated multi-vision reproduction or the like. For this, in this embodiment, a relationship between packets and the elementary stream obtained by referring to the PAT and the PMT on decoding or recording for example is stored in the object information file 130, in a form of AU table 131 and ES map table 134, without packetizing or multiplexing.

Incidentally, in FIG. 5 and FIG. 6, the source packet 144 is obtained by appending the packet arrival time stamp 145 to the TS packet 146 (refer to FIG. 4). These two are not necessarily distinguished, in considering the order, arrangement, or the like of the packets to be multiplexed.

Figure 7:
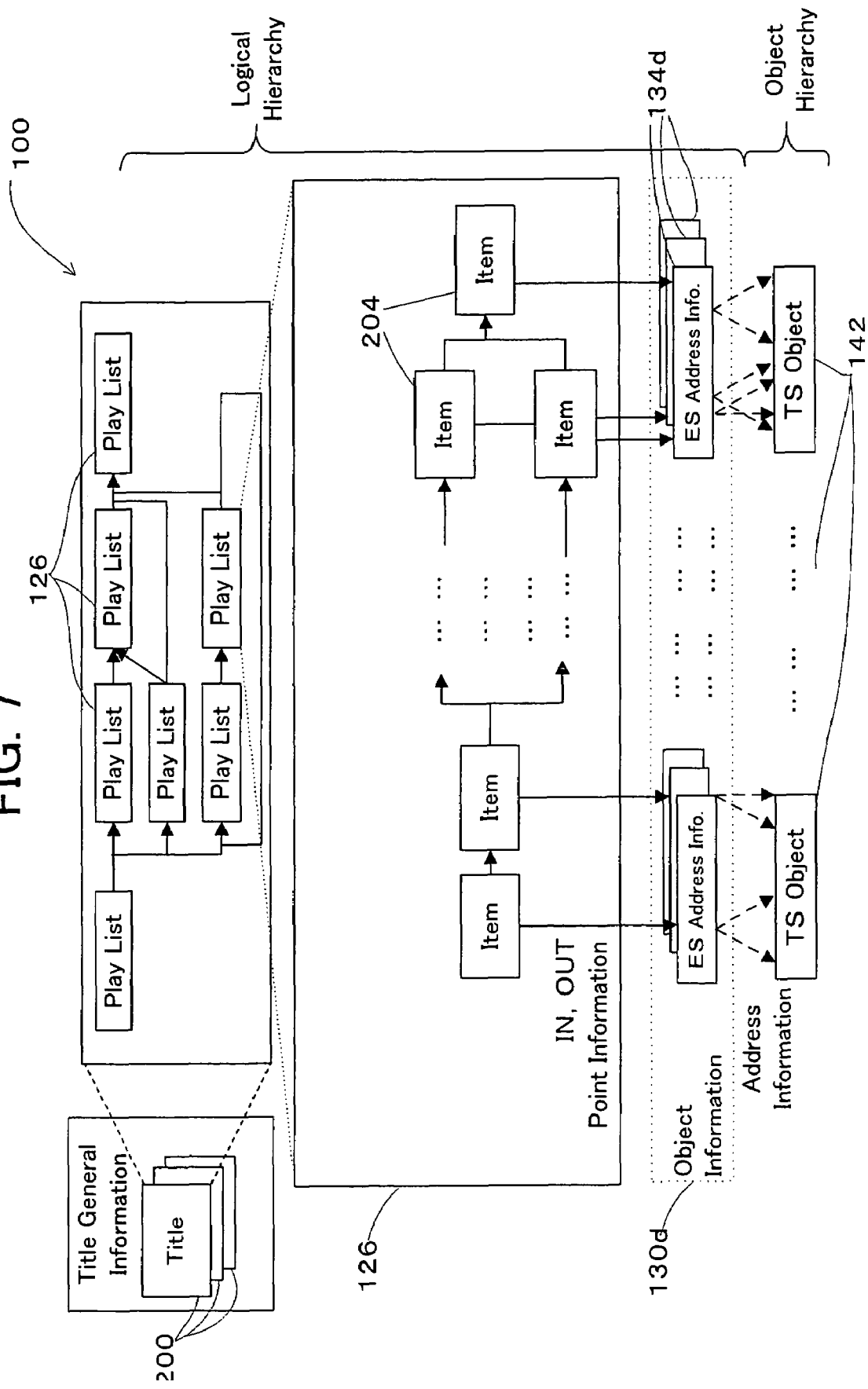
FIG. 7 is a conceptual view schematically illustrating a logical structure of data on the optical disc or the hard disk in the embodiment, focusing on development from a logical hierarchy to an object hierarchy or an entity hierarchy.

Next, with reference to FIG. 7, the logical structure of data on the optical disc 100 is discussed. FIG. 7 schematically illustrates the logical structure of data on the optical disc 100, focusing on the development from the logical hierarchy to the object hierarchy or the entity hierarchy.

In FIG. 7, one or more titles 200 that are a logically large unit such as one movie or one TV show are recorded on the optical disc 100. Each title 200 logically consists of one or a plurality of play lists 126. In each title 200, the plurality of play lists may have a sequential structure or may have a branch structure.

Incidentally, in the case of a simple logical structure, one title 200 consists of one play list 126. Furthermore, it is possible to refer to one play list 126 from the plurality of titles 200.

Each play list 126 is logically made of a plurality of items (play items) 204. In each play list 126, a plurality of items 204 may have the sequential structure or may have the branch structure. On the other hand, it is possible to refer to one item 204 from a plurality of play lists 126. The aforementioned in-point information and out-point information recorded on/in the item 204 logically designates the reproduction range of the TS object 142. Then, the object information 130d of the logically designated reproduction range is referred to and thereby the reproduction range of the TS object 142 is physically designated, via the file system finally. Here, the object information 130d includes various information to reproduce the TS object 142, such as the attribute information of the TS object 142, ES address information 134d and the like required for the data search in the TS object 142 (Incidentally, the ES map table 134 shown in FIG. 3 includes a plurality of ES address information 134d).

Then, for example, when an information recording/reproducing apparatus reproduces the TS object 142, a physical address to be reproduced in the TS object 142 is obtained from the item 204 and the object information 130d so that a desired elementary stream is reproduced.

As described above, in this embodiment, the in-point information and out-point information recorded on/in the item 204, as well as the ES address information 134d recorded in the ES map table 134 (see FIG. 3) of the object information 130d make it possible to perform the association from the logical hierarchy to the object hierarchy in the reproduction sequence so that the elementary stream can be reproduced.

(Example of Data Structure of Object Data File according to First Recording Medium)

In the embodiment, on the first recording medium, which is the above-mentioned optical disc or hard disk or the like, for example, a plurality of portion streams, such as ES (Elementary stream), constituting a plurality of programs with mutually independent time point references, are packetized and multiplexed by the unit of packet, and recorded as the transport stream in the multi program format (refer to FIG. 2(b)), for example.

Next, with reference to FIG. 7 to FIG. 10, the data structure of the TS object 142 related to the above-mentioned first recording medium in the embodiment will be explained by giving a specific example.

Figures 8, 9:
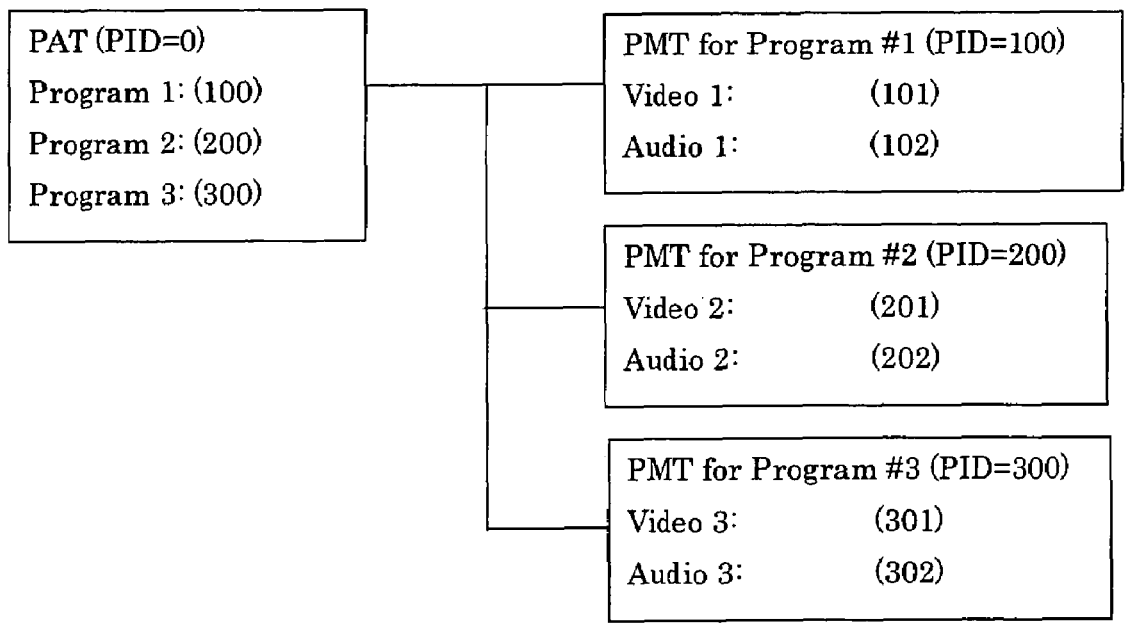
FIG. 8 is a conceptual view schematically showing a specific example of the data structure of a TS object on a first recording medium, in the embodiment.
FIG. 9 is a conceptual view schematically showing a data structure if the TS object is constructed from three programs, on the first recording medium in the embodiment.

The specific example shows the data structure of the TS object 142 constructed on the first recording medium, if the TS object 142 is constructed from three shows (a show #1, show #2, and show #3) or three programs (a PG#1, PG#2, and PG #3). FIG. 7 conceptually shows the data structure of the TS object 142 in the specific example. FIG. 9 schematically shows a data structure indicating correspondence definition information, such as the PAT, PMT, and packet ID (ES_PID) of the TS object 142, in the specific example. Moreover, FIG.

10 schematically shows the data structure of the TS object 142, constructed on the first recording medium in the specific example.

As shown in FIG. 7, the three programs (the PG#1, PG#2, and PG#3) forming the TS object 142 on the first recording medium are provided with video streams (Video 1 to 3) and audio streams (Audio 1 to 3), respectively. In each stream, there is a given packet ID for each elementary stream (ES_PID), as described above, such as "101", "102", and so on. The three programs (the PG#1, PG#2, and PG#3) can be illustrated by a plurality of angle video streams broadcasted in the multi program format or recorded onto the first recording medium.

The video streams of respective programs have different packet IDs (ES_PID) (i.e. (101), (201), ... ), and on the basis of the packet IDs, the different video streams related to different shows are reproduced. In other words, by using a plurality of video streams, it is possible to change the video streams in response to the program change (namely, different video images, e.g. multi visions, can be reproduced). Even the audio streams have different packet IDs (ES_PID) (i.e. (101), (201), ... ), and on the basis of the packet IDs, the different audio streams related to different shows are reproduced. In other words, by using a plurality of audio streams, it is possible to change the audio streams in response to the program change (namely, different audio can be reproduced).

FIG. 9 is a conceptual view schematically showing the structure of three programs on the MPEG in the PAT and PMT of the TS object constructed on the first recording medium shown in FIG. 7.

As shown in FIG. 9, the programs are sorted by each show. On the transport stream, one PAT (having a defined ES_PID of (000)) allows a plurality of PMTs (having defined ES_PIDs of (100), (200) and (300)) to be specified. Moreover, these PMTs allows the packet IDs of all the elementary streams (ES_PIDs) related to the program#1 (PG#1) to the program#3 (PG#3) to be specified.

The data structure constructed on the first recording medium (e.g. a hard disk) discussed with reference to FIG. 7 and FIG. 9 is shown in FIG. 10.

That is, in FIG. 10, the first recording medium has such a data structure that there is constructed a title#1 provided with a play list #1 (P list #1) which designates one Item (Item#1). Moreover, the play list #1 is associated with one TS#1 object, through one Item. For example, the title#1 related to a plurality of angle video streams broadcasted in the multi program format or recorded on the first recording medium is logically constructed to perform the reproduction change of a plurality of content information, seamlessly or non-seamlessly, such as multi view change, by changing mutually different programs.

Moreover, in FIG. 10, in the TS object, a plurality of elementary streams, which make groups as shows or programs, such as a video stream and audio stream constituting one movie, are grouped into PUs (Presentation Units) representing sub groups. Moreover, the plurality of PUs, which are mutually changeable groups in the reproduction of the plurality of content information, are grouped as an AU (Association Unit) representing a related group. In other words, the reproduction change of the plurality of content information can be performed, relatively easily, by specifying elementary streams which belong to mutual different PUs in the range of the same AU. Incidentally, information about which elementary stream belongs to which PU, and which PU belongs to which AU, specifically, is written in the AU information 132I (refer to FIG. 3) in the AU table 131. The detailed structure of the AU table will be discussed in detail later.

(Example of Data Structure of Each Information File according to First Recording Medium)

Next, with reference to FIG. 11 to FIG. 14, the data structures of the various information files constructed on the first recording medium (e.g. a hard disk) on which the recording is performed in the multi program format in the embodiment, i.e., (1) the disc information file 110, (2) the play list information file 120, and (3) the object information file 130, discussed with reference to FIG. 3, will be discussed by using their own specific examples.

(1) Disc Information File:

At first, with reference to FIG. 11 and FIG. 12, the disc information file 110 constructed on the first recording medium (e.g. a hard disk) on which the recording is performed in the multi program format in the embodiment will be discussed in detail by using one specific example. FIG. 11 schematically shows one specific example of a data structure in the disc information file 110. FIG. 12 schematically shows one specific example of a data structure in the title information table 114 included therein.

In this specific example, as shown in FIG. 11, the disc information file 110 stores therein the disc general information 112, the title information table 114, and the other information 117.

Among them, the disc general information 112 is general or comprehensive disc information, such as disc volume information, indicating the serial number of series constructed on a plurality of recording media, and total title number information, for example.

The title information table 114 stores therein all the play lists constituting each title, and other information, e.g. information for each title, such as chapter information within the title and the like, and includes title pointer information, title #1 information, title #2 information, and so on. Here, the "title pointer information" is the storage address information of the title #n information, i.e. the storage address information indicating the storage position of the title #n information in the title information table 114, as the correspondence is shown with arrows in FIG. 11. The "title pointer information" is written with a relative logical address. It is arranged in order of titles as the relative logical address, by the number of titles in the first recording medium (e.g. a hard disk). Incidentally, the data amount of each storage address information may be a fixed byte or a variable byte.

In the embodiment, particularly as shown in FIG. 12, in the title pointer, there is written information about the maximum number of programs (shows) (Max program number) which can be changed in the reproduction change of a plurality of content information in the title #n (in this case, #1), in addition to the storage address information. As for the maximum number, a value of "1" may be set, in the case of normal reproduction in which a plurality of content information is not reproduced with change, and the fact may be identified. The maximum number of the programs (shows) may be fixed in the same title, or may be variable in the same title.

In FIG. 11 again, the other information 117 is information about each title, such as the title type, e.g., the sequential type, the branch type, and the like, and the total number of play lists.

(2) Play List Information File:

Next, with reference to FIG. 13, the play list information file 120 constructed on the first recording medium (e.g. a hard disk) on which the recording is performed in the multi program format in the embodiment will be discussed in detail by using one specific example. FIG. 13 schematically shows one specific example of a data structure on the play list information table 121 constructed in the play list information file 120.

In this specific example, as shown in FIG. 13, the play list information file 120 stores therein the play list general information 122, the play list pointer table 124, and the play list #1 information table 126, for each Field type, as the play list information table 121 (refer to FIG. 3).

Each Field may have a structure that allows the necessary number of respective tables to be appended. For example, if there are four play lists, the relative Field may increase to four Fields under this structure, and so does the Item information table of the play list #1.

Among them, in the play list general information (P list general information) 122, there are described the size of the play list table, the total number of play lists, and the like.

The play list pointer table (P list pointer table) 124 stores therein the address of each play list written position as being the relative logical address in the play list information table 126, as the correspondence is shown with arrows in FIG. 13.

The play list #1 information table (P list #1 information table) 126 stores therein general or comprehensive information about the play list #1, the Item information table of the play list #1 (P list Item information table) and other information.

The "Item information table of the play list #1" stores therein the Item information by the total number of Items constituting one program list. Here, an AU number in the AU (Associate Unit) table written in the "Item #1 (Item #1 information)" is the AU number of an AU which stores information for specifying the address of the TS object to be used for the Item reproduction, or for specifying each elementary stream (i.e. the video stream, the audio stream, or the sub picture stream) in the TS object to be used for the Item reproduction. Moreover, in the Item information, there may be stored the PU number of a PU in default reproduction which belongs to the AU.

Figure 14:
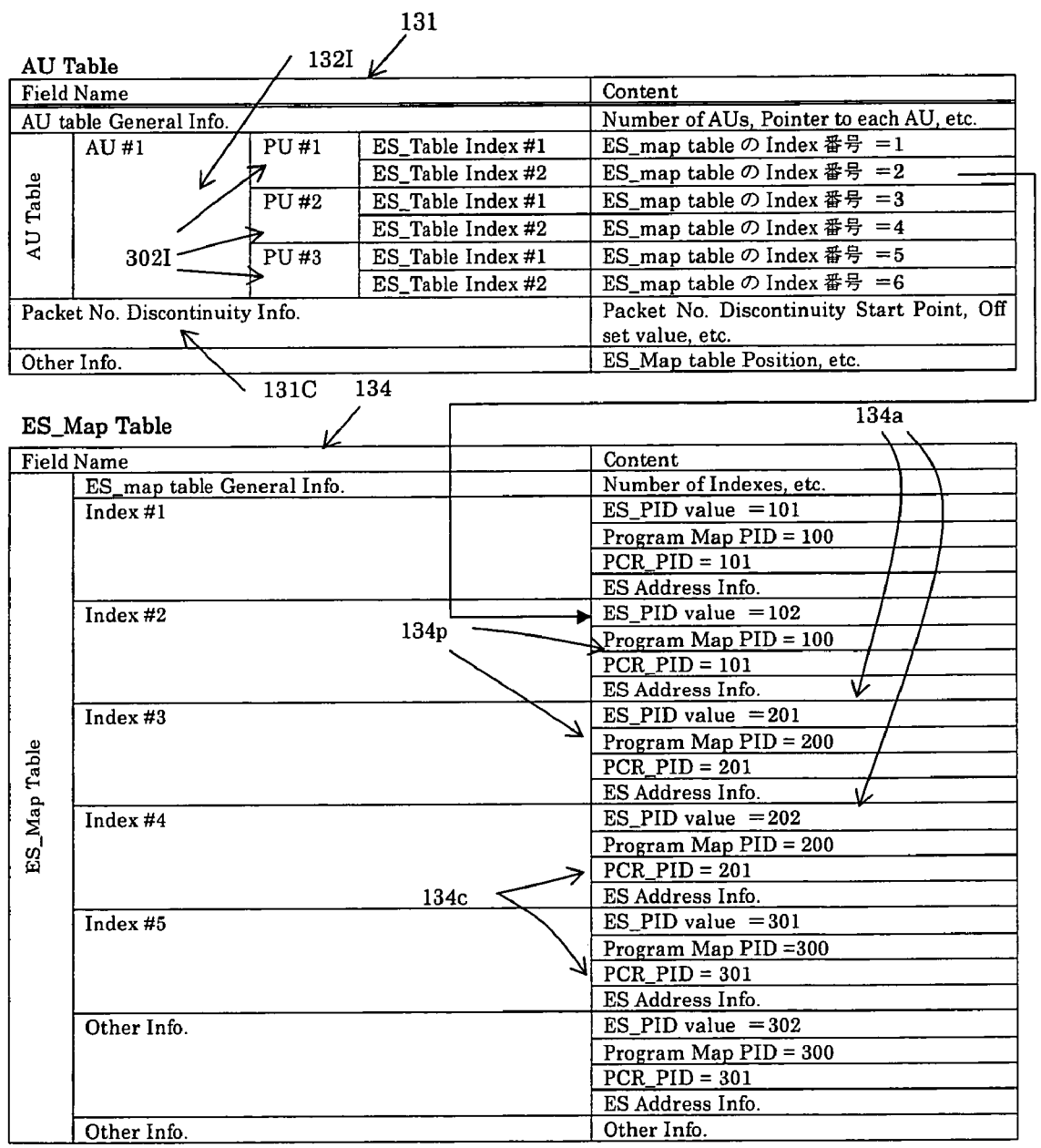
FIG. 14 is a structural diagram schematically showing one specific example of a data structure in an AU table constructed in an object information file and an ES map table associated therewith, on the first recording medium, in one specific example of the embodiment.

(3) Object information file:

Next, with reference to FIG. 14, the object information file 130 constructed on the first recording medium (e.g. a hard disk) on which the recording is performed in the multi program format in the embodiment will be discussed in detail by using one specific example. FIG. 14 schematically shows one specific example of a data structure in the AU table 131 (refer to FIG. 3) constructed in the object information file 130 and the ES map table 134 (refer to FIG. 3) associated therewith.

In this specific example, as shown in FIG. 14, the object information file 130 stores therein an object information table. The object information table consists of the AU table 131 shown in the upper part in FIG. 14 and the ES map table 134 shown in the lower part in FIG. 14.

In the upper part in FIG. 14, the AU table 131 may have a structure that allows the necessary number of tables to be appended. For example, if there are four AUs, the relevant Field may increase to four Fields.

The AU table 131 stores therein "AU table general information" in which the number of AUs and a pointer to each AU, and the like are written, "packet number discontinuity information" and "other information".

In the AU table 131, there are described the Index number (Index number= . . . ) of the corresponding ES map table 134, as the AU information 132I indicating an ES table Index #1 (ES_table Index #1) in each PU #m corresponding to each AU #n. Here, the "AU" is a unit corresponding to the reproducible "related group", and it includes one or more PUs, each of which is a reproduction unit. The "PU" is a unit corresponding to the "sub group" which is included in each AU, as described above, and which can be mutually reproduced by changing. Moreover, the "PU" is a group of elementary streams. The ES table Index # (number) corresponding to each PU is specified by PU information 3021. If reproducible programs or shows are constructed by the program change in the AU, the AU stores a plurality of PUs, and each PU stores pointers to a plurality of elementary stream packet IDs for indicating packets constituting each program or show. This indicates an index number in the ES map table 134, described later.

Particularly in the embodiment, in the AU table, there is appended discontinuity information 131C indicating the discontinuous state of packet numbers if the lack of packet occurs by edit processing in the continuous number (serial number) of packets in the above-mentioned TS object 142. By using the discontinuity information, without newly appending a packet number if there is the lack of packet, it is possible to specify the address of a packet which is an access object, by counting the number of packets with consideration of the discontinuous state (beginning at a designated packet in the elementary stream) indicated by the discontinuity information. The discontinuity information includes information indicating the start point of the discontinuity and the number of lacked packets. As described above, only one discontinuity information 131C is collectively written for a plurality of AUs and is excellent from the viewpoint of saving a recording capacity.

Particularly in the embodiment, each AU information 1321 includes AU attribute information indicating the total number of PUs which belong to the AU, identification information for identifying whether or not the AU can be reproduced by the program change, and the like.

Moreover, each PU information 302I includes PU attribute information indicating the number of elementary streams (ES) and the like. This PU attribute information may also include even show number information indicating a show number (e.g. 1, 2, 3, and so on) corresponding to the PU if it is for the PU which belongs to the AU constituting a show which can be reproduced by the program change. Moreover, this PU stores therein pointers to ES_PIDs constituting a show at each channel.

In the lower part in FIG. 14, the ES map table 134 stores therein ES map table general information, a plurality of Indexes #m (m=1, 2, . . . ), and "other information", for each Field.

In the "ES map table general information", there are written the size of the ES map table, the total number of Indexes, and the like.

The "Index #1" includes the elementary stream packet ID (ES_PID) of the elementary stream to be used for the reproduction and the address information of the elementary stream.

Particularly in the embodiment, the ES map table 134 in FIG. 14 includes "ES address information 134a" as being the address information of the elementary stream, and further includes: a program map PID 134p indicating the packet ID number of the PMT inherently given to each program in the TS object, as described above; and a reference packet designation information (PCR_PID) 134c for designating the packet ID number of the TS packet 146 which holds the time point reference value of each program, described later.

Here, the program map PID 134p is the packet ID of the above-mentioned PMT (Program Map Table) (in other words, which is the ES_PID of the PMT, such as (100), (200) and (300), for example).

On the other hand, the reference packet definition information (PCR_PID) 134c is information for designating the packet ID (ES_PID) of the TS packet 146 which holds the above-mentioned PCR value 149b, i.e. the numerical value information indicating the time point reference information (program clock reference).

Particularly in the embodiment, a packet number (SPN) and a display start time point corresponding thereto are written as the ES address information 134a. As mentioned above, if the elementary stream is the MPEG 2 video stream, only the address of the TS packet at the head of an I picture is written in the ES map table 134 as the address information 134a, to thereby reduce the data amount.

By virtue of such construction, it is possible to obtain the elementary stream packet ID (ES_PID) of the actual elementary stream from the Index number of the ES map table 134 designated from the AU table 131. Moreover, the address information 134a of the elementary stream corresponding to the ES address information can be obtained at the same time, it is possible to reproduce the object data on the basis of these information.

Incidentally, this is not written in FIG. 14, however, the ES_PID which is not referred to from the AU table 131 in the upper part may be written for each Index of the ES map table 134 in the lower part. If the more versatile ES map table 134 is prepared by even writing the ES_PID not to be referred to, there is an advantage that it is unnecessary to reconstruct the ES map table when content is reedited, such as when authoring is performed again, for example.

(Example of Packet Structure According to First Recording Medium)

Figure 15:
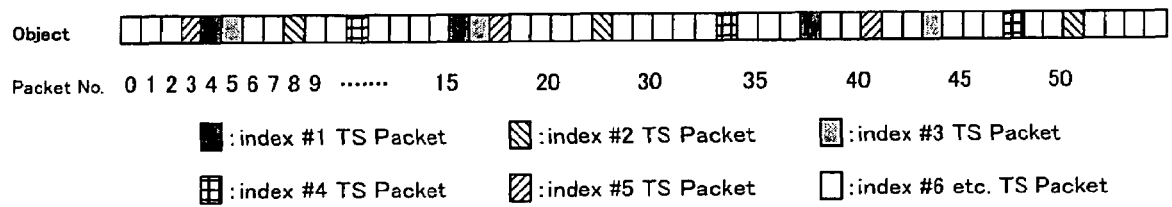
FIG. 15 is a conceptual view schematically showing a recording state example of a head portion packet in the object data file in the embodiment.

Next, with reference to FIG. 15 and FIG. 16, the packet structure of the object data in the object data file constructed on the first recording medium (e.g. a hard disk) on which the recording is performed in the multi program format in the embodiment will be explained by giving a specific example. FIG. 15 conceptually shows a state that the TS packets are multiplexed and recorded at the head portion of the object data file on the first recording medium. Incidentally, in FIG. 15, a numerical number represents a packet number, and here, it is shown as packet numbers (the continuous numbers of packets) starting from #0, at the head portion in the object data file on the first recording medium. FIG. 16 shows tables indicating a correspondence relationship between the packet number and a display time point in each stream on the first recording medium.

Blank packets (e.g. packet numbers of "0", "1", "2", "3" etc.) in FIG. 15 are used as packets for the control information, such as the above-mentioned PAT and PMT, other than packets which store therein the content information, such as the video packet and the audio packet".

Moreover, in FIG. 15, packet numbers of "4", "16", "38" etc. indicate the packet numbers of the TS packets 146 with the packet ID of (101) indicated by the Index#1 in the ES map table 134 (refer to FIG. 14). In the same manner, packet numbers of "5", "17", "44" etc. indicate the packet numbers of the TS packets 146 with the packet ID of (201) indicated by the Index#3 in the ES map table 134. In the same manner, packet numbers of "3", "17", "41" etc. indicate the packet numbers of the TS packets 146 with the packet ID of (301) indicated by the Index#5 in the ES map table 134.

In the embodiment, as shown in FIG. 16, the ES address information 134a (refer to FIG. 14 etc.) of the ES map table 134 related to the video information for reproduction stores therein the "display start time point" and the "packet number" of the corresponding TS packet 146.

More specifically, FIG. 16 shows a specific example of the ES address information 134a (refer to FIG. 14.) in each of the packets with the packet IDs of (101), (201), and (301) as being the video streams of PG#1, PG#2, and PG#3 corresponding to the Index#1, Index #2, and Index#3, respectively, in the ES map table 134 on the first recording medium on which the recording is performed in the multi program format. The ES address information 134a stores therein the "display start time point" and "packet ID" of the corresponding TS packet 146. Here, the "display start time point" is recorded on the time axis, defined on the basis of a time reference indicated by the PCR value (refer to FIG. 4) as being the time point reference information, included in the TS packet designated by the reference packet designation information, such as the PCR_PID, written in the PMT for the elementary stream to which each TS packet 146 belongs.

Moreover, in the ES address information shown in FIG. 16 and the like, preferably, the packet number related to the I picture and the corresponding display start time point are written, but these packet number etc. are not written about a B picture or P picture or the audio information or sub-picture information. By this, upon reproduction, it is possible to specify the address of the TS packet on the basis of the packet number related to the I picture, and reproduce the I picture on the basis of the display start time point corresponding to the address. Moreover, on the basis of the I picture, the B picture and the P picture can be reproduced. If there is the audio information or sub-picture information corresponding to such video information, the audio information or sub-picture information can be reproduced. Particularly in this case, there is no need to write the address information of the TS packet related to the B picture and the P picture, and the address information of the TS packet related to the corresponding audio information, so that it is possible to decrease the amount of information recorded onto the information recording medium as a whole.

(Obtaining Packet and Method of Reconstructing PTS and the like)

Next, with reference to FIG. 17, a detailed explanation will be given on packet processing in which a presentation time stamp written on mutually different time axes for respective programs is converted into a presentation time stamp shown on the same time axis. Incidentally, such processing is mainly executed by a system controller constituting the embodiment of an information recording/reproducing apparatus described later.

Particularly in the method of the embodiment, (i) a ES_PID as being one example of the correspondence definition information, (ii) a packet arrival time ATS (Arrival Time Stamp) (hereinafter, simply referred to as an "ATS") as being one example of the arrival time point information, (iii) a program time point reference value PCR (Program Clock Reference) (hereinafter, simply referred to as a "PCR value") as being one example of the time point reference information, and (iv) a presentation time stamp PTS (hereinafter, simply referred to as a "PTS") as being one example of the display time point information, with respect to a plurality of TS packets, are obtained from the first recording medium by an information recording apparatus. Then, on the basis of the obtained ATS, a display time point which is indicated by the obtained PTS and which is shown on mutually different time axes related to a plurality of programs and based on different PCR values, is converted to a display time point shown on the same time axis based on the same PCR value.

Here, an explanation will be given on a procedure of converting a display time point which is shown on mutually different time axes related to the program #1 (PG#1) and the program #2 (PG#2), to a display time point shown on the same time axis as being the time axis of the PG#1.

Firstly, for example, on the first recording medium, such as a hard disk, a plurality of elementary streams (ES) constituting a plurality of programs having mutually independent references of the PTS are packetized and multiplexed by the unit of packet, and recorded as a transport stream (TS). More specifically, on the first recording medium, the PAT, PMT, and ES_PID for defining a correspondence relationship between a plurality of TS packets and a plurality of portion streams, the ATS indicating the arrival time of the TS packet, the PTS indicating the display time point of the TS packet, and the PCR value indicating the time point reference of the time axis for each program are packetized and recorded (refer to FIG. 4). Moreover, on the first recording medium, the ES map table which stores therein the PCR_PID (PCR packet ID) for each Index, as being one example of the reference packet designation information for designating the TS packet including the PCR value, and the ES_PID for each Index, and the like are recorded in the object data file (refer to FIG. 14).

As a specific example, on the first recording medium, the TS packet with a packet ID of (101) is defined in the ES map table as the portion stream for transmitting the video data of the program#1 (PG#1). This packet ID, an ATS#1 indicating the arrival time of the TS packet, and a PTS#1 indicating the display time point of the TS packet are recorded. In the TS packet of the PMT with a packet ID of (100), the PCR_PID for designating the TS packet including a PCR#1 indicating the time point reference of the time axis of the program#1 (PG#1) is set as (101).

In the same manner, the TS packet with a packet ID of (201) is defined in the ES map table as the portion stream for transmitting the video data of the program#2 (PG#2). This packet ID, an ATS#2 indicating the arrival time of the TS packet, and a PTS#2 indicating the display time point of the TS packet are recorded on the first recording medium. In the packet of the PMT with a packet ID of (200), the PCR_PID for designating the TS packet including a PCR#2 indicating the time point reference of the time axis of the program#2 (PG#2) is set as (201).

Here, in the TS packet with a packet ID of (201), it is assumed that the display time point shown on the time axis related to the program #2 (PG#2) before conversion is a "PTS_OLD", and that the display time point shown on the time axis related to the program #1 (PG#1) after conversion is a "PTS_NEW".

Moreover, it is also assumed that a clock frequency on which the count values of the PCR and the PTS are based is M (Hz), and that a clock frequency on which the count value of the ATS is based is N (Hz). For example, the PCR and the PTS are counted by a clock frequency of 90 KHz, and the ATS is counted by a clock frequency of 27 MHz.

From the above-mentioned variables and constant, the PTS_NEW is calculated by the following equation (1).

$$PTS\_NEW = PCR\#1 + (ATS\#2 - ATS\#1) * M/N + PTS\_OLD - PCR\#2 \quad (1)$$

Consequently, according to the method in the embodiment, the PTS_OLD as being the display time point which is shown on mutually different time axes related to the program #1 (PG#1) and the program #2 (PG#2) is converted to the PTS_NEW as being the display time point shown on the same time axis which is the time axis of the program #1 (PG#1). Moreover, as described later, the TS packet with a packet ID of (201) is converted to the one with a packet ID of (103).

(Method of Advancing ATS) Next, with reference to FIG. 17, an explanation will be given on a process of advancing the ATS 145 which is given to the TS packet 146, used in the above-mentioned equation (1) discussed in FIG. 17.

The ATS (packet arrival time stamp) 145 indicating the arrival time and given to the TS packet 146 has a fixed bit length. Thus, in accordance with count up with the passage of time, necessarily, at a certain time point, the value of the ATS 145 indicating the arrival time point and given to the TS packet 146 after the certain time point becomes smaller than that of the ATS 145 before the certain time point. The cycle of reversing the inequality of this numerical value is about 40 seconds if the packet arrival time stamp 145 of a 32 bit length is counted by a clock frequency of 27 MHz, for example.

Now, for the comparison of the inequality of the numerical value of the individual ATS 145, advancing number information of a 16 bit length is appended, and the bit length of the ATS 145 is set to be a 47$b$ it length in total.

In the advancing process, the value of the ATS 145 of the relevant TS packet 146 and the value of the ATS 145 of the one before arrived TS packet 146 are compared. If the value of the ATS 145 of the relevant TS packet 146 is smaller, the advancing number information of the ATS 145 of the relevant TS packet 146 is incremented only by "1".

In the MPEG standard, the TS packets 146 designated by the PCR_PID, PAT, PMT, and the like, mentioned above, arrive at intervals of 100 ms or less, so that only the comparison with the value of the ATS 145 of the one before arrived TS packet 146 is enough. This is because there is little or no chance for the TS packet 146 not to arrive in more than about 40 seconds.

Consequently, by performing the advancing process, there is little or no chance to reverse the inequality of the value of the ATS 145 which is given to the TS packet 146, in a time series.

(Example of Data Structure of Object Data File related to Second Recording Medium)

In the embodiment, on the second recording medium, which is the optical disc or the like, for example, a plurality of portion streams, such as ES (Elementary stream), constituting a single program with a mutually equal time point reference, are packetized and multiplexed by the unit of packet, and recorded as the transport stream in the single program format (refer to FIG. 2(*b*)), for example.

Next, with reference to FIG. 19 to FIG. 23, an explanation will be given on a specific example of the data structure of the object data file in which the logical information and the data for reproduction control, such as the PTS, the packet ID, and the ES map table described above, are reconstructed and recorded onto the second recording medium (e.g. an optical disc, such as a DVD), by an information recording/reproducing apparatus in an embodiment of the present invention described later. Incidentally, the explanation of the same parameters and the like as those of the first recording medium will be omitted, as occasion demands.

Figures 19, 20:
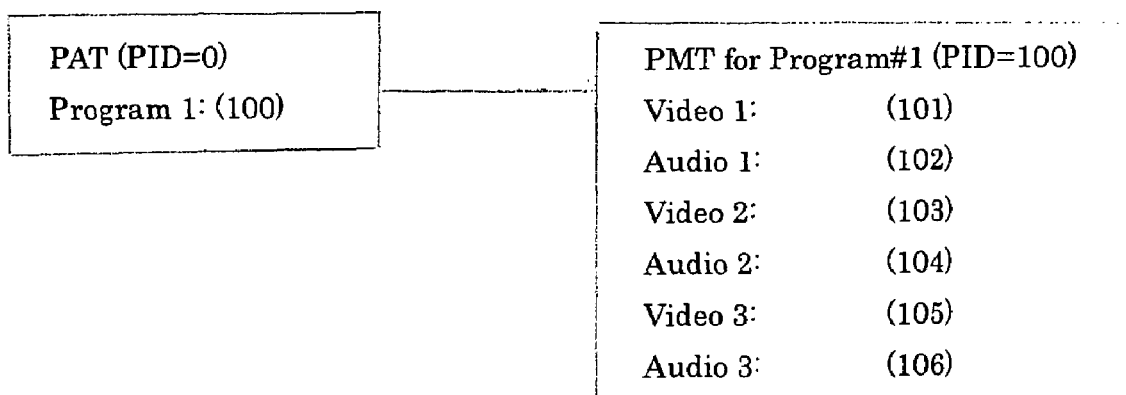
FIG. 19 is a conceptual view showing a specific example of the data structure of a TS object after reconstruction on a second recording medium, in the embodiment.
FIG. 20 is a conceptual view schematically showing a data structure if the TS object is reconstructed from one program, on the second recording medium in the embodiment.
Figure 21:
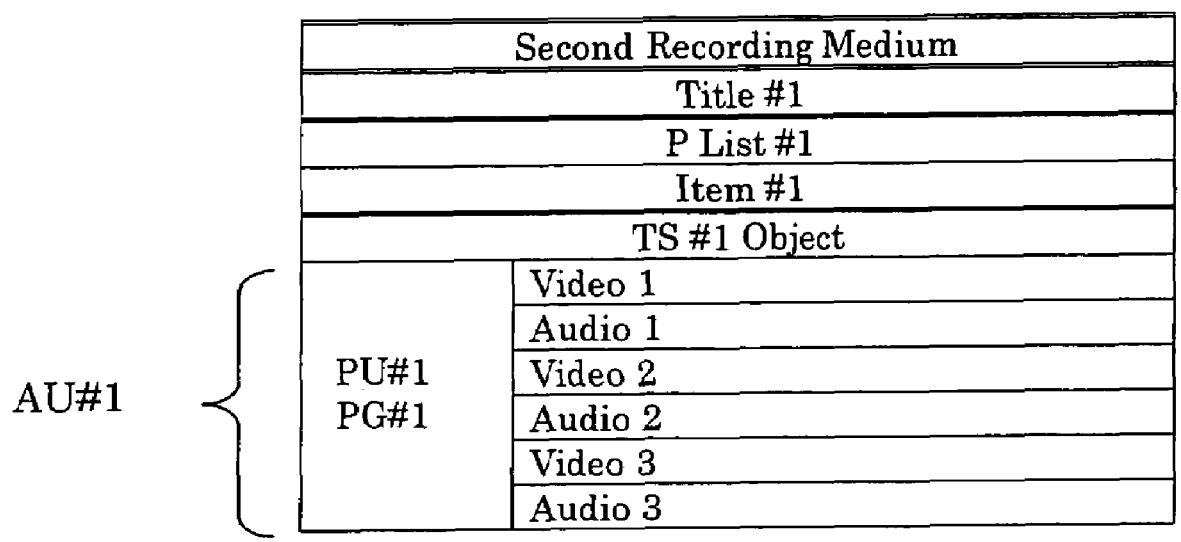
FIG. 21 is a conceptual view schematically showing the data structure of the TS object, reconstructed on the second recording medium in the embodiment.

The specific example shows the data structure of the TS object 142 in which the three programs (the PG#1, PG#2, and PG #3) on the first recording medium are converted to one program #1 (PG1) and recorded onto the second recording medium, by the reconstruction method in the above-mentioned embodiment. FIG. 19 conceptually shows the data structure of the TS object 142 in the embodiment. FIG. 20 schematically shows a data structure indicating the PAT, the PMT, and the packet ID (ES_PID) in the embodiment. FIG. 21 schematically shows the data structure of the TS object, in the embodiment.

As shown in FIG. 19, on the second recording medium, the three programs (the PG#1, PG#2, and PG #3) constituting the TS object, are converted to one program #1 (PGI), and the packet IDs (ES_PID) of respective portion streams of video streams (Videos 1 to 3) and audio streams (Audios 1 to 3) are converted like (103), (104), and so on.

As shown in FIG. 20, on the second recording medium, the TS object is converted or reconstructed to one program #1 (PG1). In this case, on the transport stream as shown in FIG. 6, one PMT (ES_PID is defined as (100)) is specified by one PAT (ES_PID is defined as (000)), and moreover, the packet IDs (ES_PID) of all the elementary (portion) streams are converted like (103), (104), and so on, by this PMT. The reference packet designation information (PCR_PID) 134c is reconstructed to (101).

The data structure constructed on the second recoding medium (e.g. an optical disc, such as a DVD), explained with reference to FIG. 19 and FIG. 20, is shown in FIG. 21.

That is, in FIG. 21, the second recording medium has such a data structure that there is constructed the title#1 provided with the play list #1 (P list #1) which designates one Item (Item#1). Moreover, the play list #1 is associated with one TS#1 object, through one Item.

Thus, upon reproduction of the second recording medium, by using the ES_PID and the like, constituting one example of the "processed correspondence definition information" of the present invention and recorded on the second recording medium, it is possible to extremely efficiently perform the reproduction change of a plurality of content information, seamlessly or non-seamlessly, such as angle change, multi view change, and multi vision change, as processing in a single program, by a stream change.

Incidentally, even by using the PAT, PMT, and the like constituting another example of the "processed correspondence definition information" of the present invention and recorded on the second recording medium, it is possible to perform various reproduction changes, as processing in a single program, by the stream change.

Moreover, in FIG. 21, in the TS object, a plurality of elementary streams, which make groups as shows, such as a video stream and audio stream constituting one movie, are converted to one PU (Presentation Unit). Moreover, information about which elementary stream belongs to which PU, and moreover, information about which PU belongs to which AU is written in the AU information 132I (refer to FIG. 3) in the AU table 131. The detailed structure of the AU table is as described above. Therefore, even upon reproduction of the second recording medium, using the AU information and the PU information makes it possible to reproduce the various information while the various reproduction control, such as angle change, can be performed by a relatively simple control.

(Example of Data Structure of Each Information File according to First Recording Medium)

Figure 22:
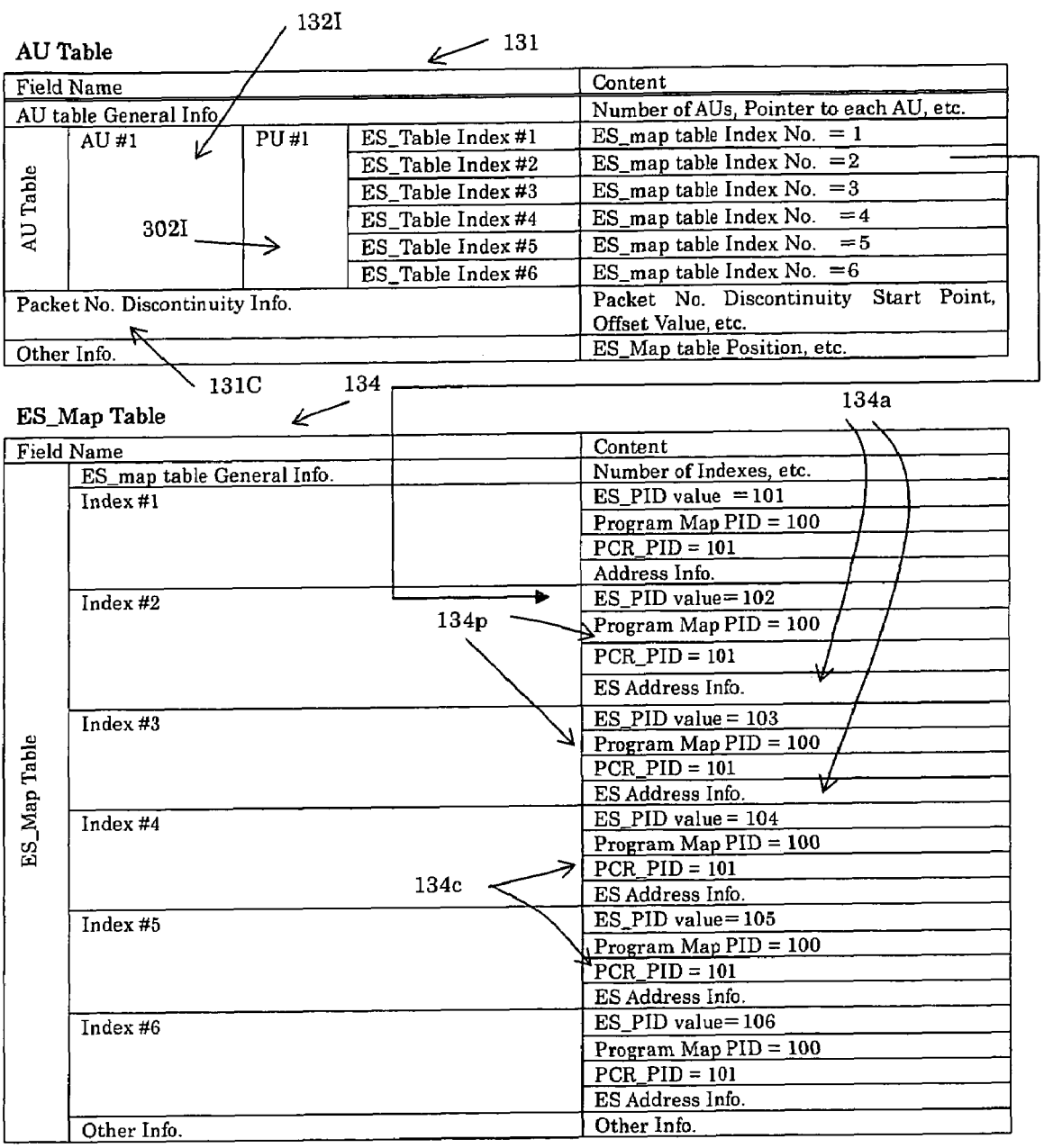
FIG. 22 is a structural diagram schematically showing one specific example of a data structure in an AU table constructed in an object information file and an ES map table associated therewith, on the second recording medium, in one specific example of the embodiment.

Next, with reference to FIG. 22 and FIG. 23, the data structure of the object information file 130 constructed on the second recording medium (e.g. an optical disc) on which the a second entire stream in the single program format in the embodiment is recorded will be discussed by using one specific example. FIG. 22 schematically shows one specific example of a data structure in the AU table 131 (refer to FIG. 3) constructed in the object information file 130 and the ES map table 134 (refer to FIG. 3) associated therewith. FIG. 23 shows tables indicating a correspondence relationship between the packet number and the display time point in each stream on the second recording medium.

In this specific example, as shown in FIG. 22, the object information file 130 stores therein an object information table. The object information table consists of the AU table 131 shown in the upper part in FIG. 22 and the ES map table 134 shown in the lower part in FIG. 22.

In the AU table 131 in the upper part in FIG. 22, as for the PU, the three structures of PU#1 to PU#3, as shown in FIG. 14, are converted to one structure of PU#1.

In the ES map table 134 in the lower part in FIG. 22, the program map PID 134p indicating the packet ID number of the PMT inherently given to each program, as described above is all set to (100), in the Index "m (m=3, 4, and so on). Moreover, the PCR_PID 134c for designating the TS packet which includes the time point reference of the time axis for each program, described above, is all set to (101). That is, on the second recording medium, the transport stream of a single program having the mutually equal PCR_PID is reconstructed.

In the embodiment, as shown in FIG. 23, the ES address information 134a (refer to FIG. 16 etc.) in the ES map table 134 reconstructed on the second recording medium stores the "display start time point" and the "packet number" of the corresponding TS packet.

As shown in FIG. 23, on the second recording medium on which the transport stream (refer to FIG. 2(b)) in the single program stream, the ES address information 134a in the ES map table 134 is reconstructed such that the ES_PIDs for the Indexes#1, #3, and #5 (refer to FIG. 22) are (101), (103), and (105), respectively. In the ES address information 134a, there are written the PTS and the packet number after conversion, as described above, which are related to the corresponding TS packet. The PTS herein is shown on the same time axis in one program #1, with the PCR_PID 134c as (101), namely, on the basis of the same time point.

(Information Recording/Reproducing Apparatus)

Figure 24:
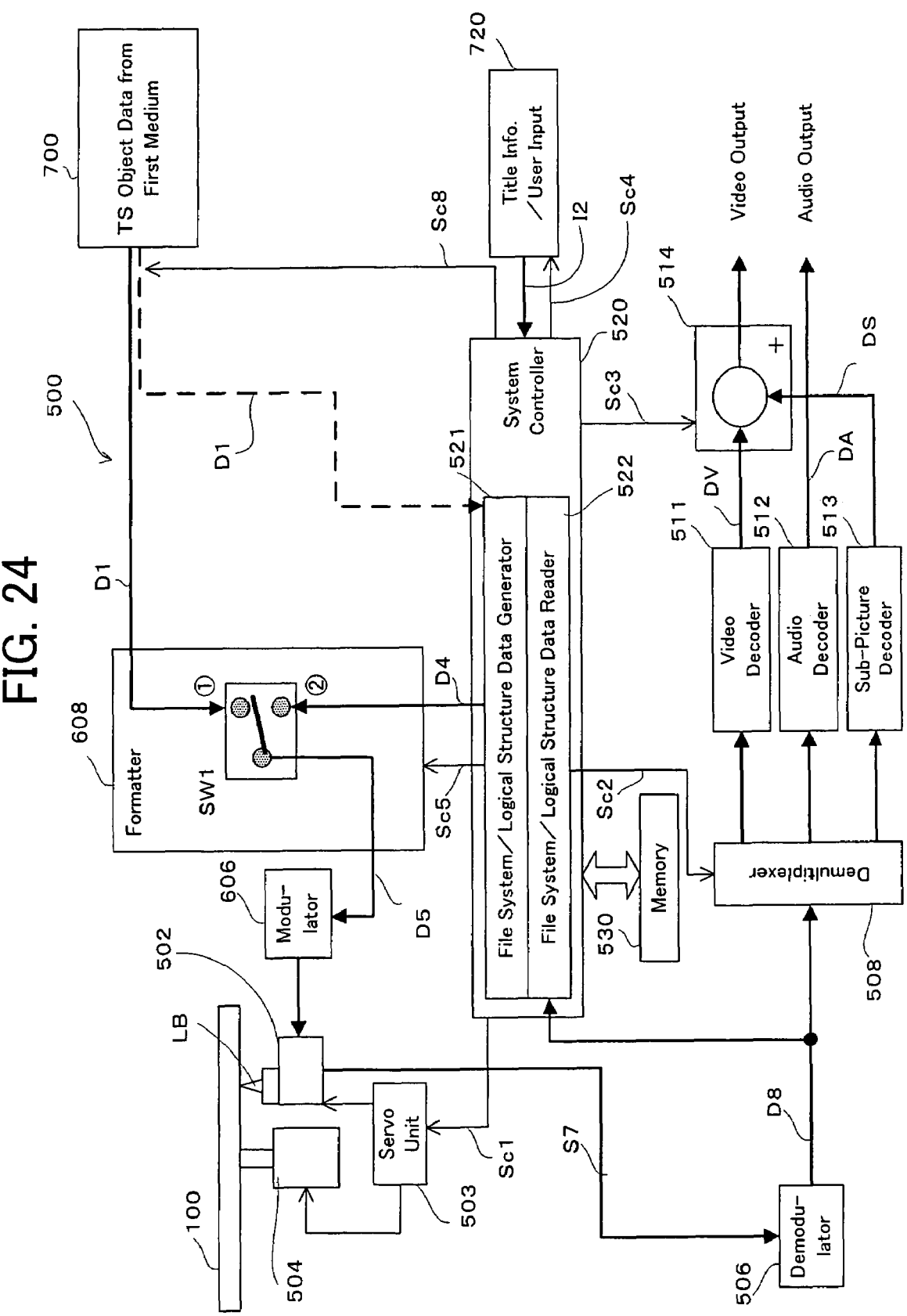
FIG. 24 is a block diagram schematically illustrating an information recording/reproducing apparatus in the embodiment of the present invention.
Figure 25:
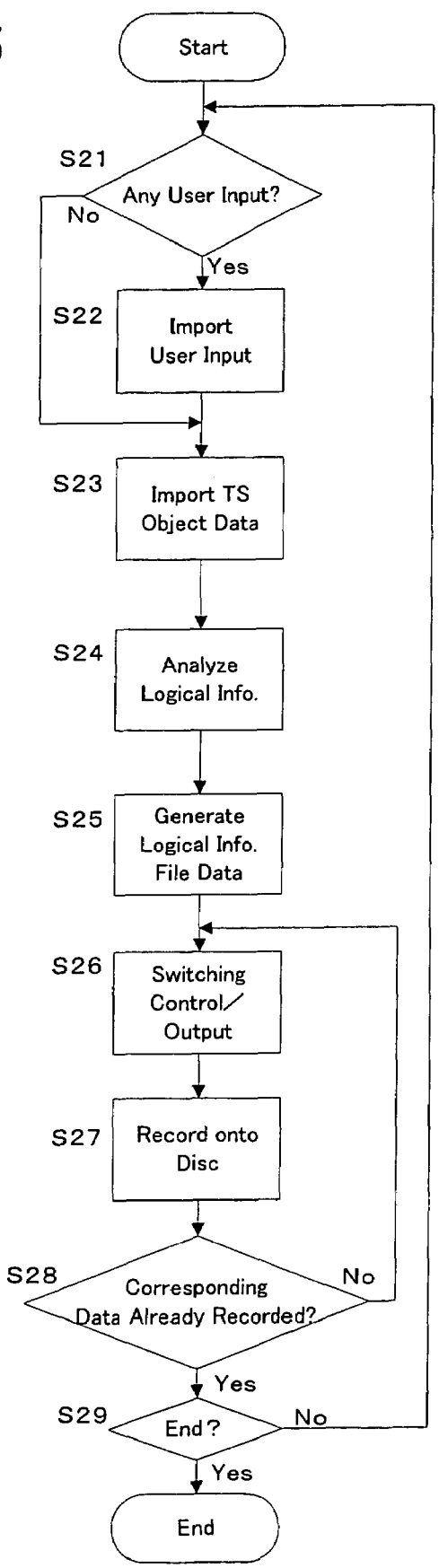
FIG. 25 is a flowchart showing a recording operation of the information recording/reproducing apparatus in the embodiment.
Figure 26:
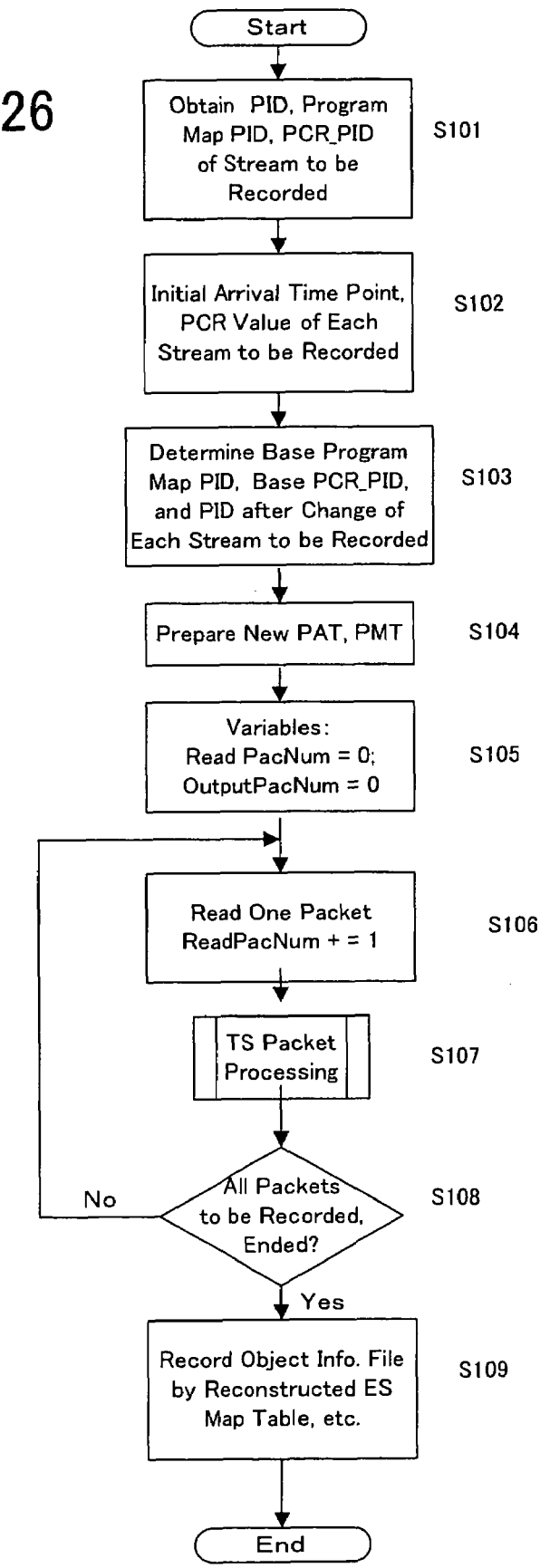
FIG. 26 is a flowchart showing a process of converting and recording the elementary stream, in the embodiment.
Figure 27:
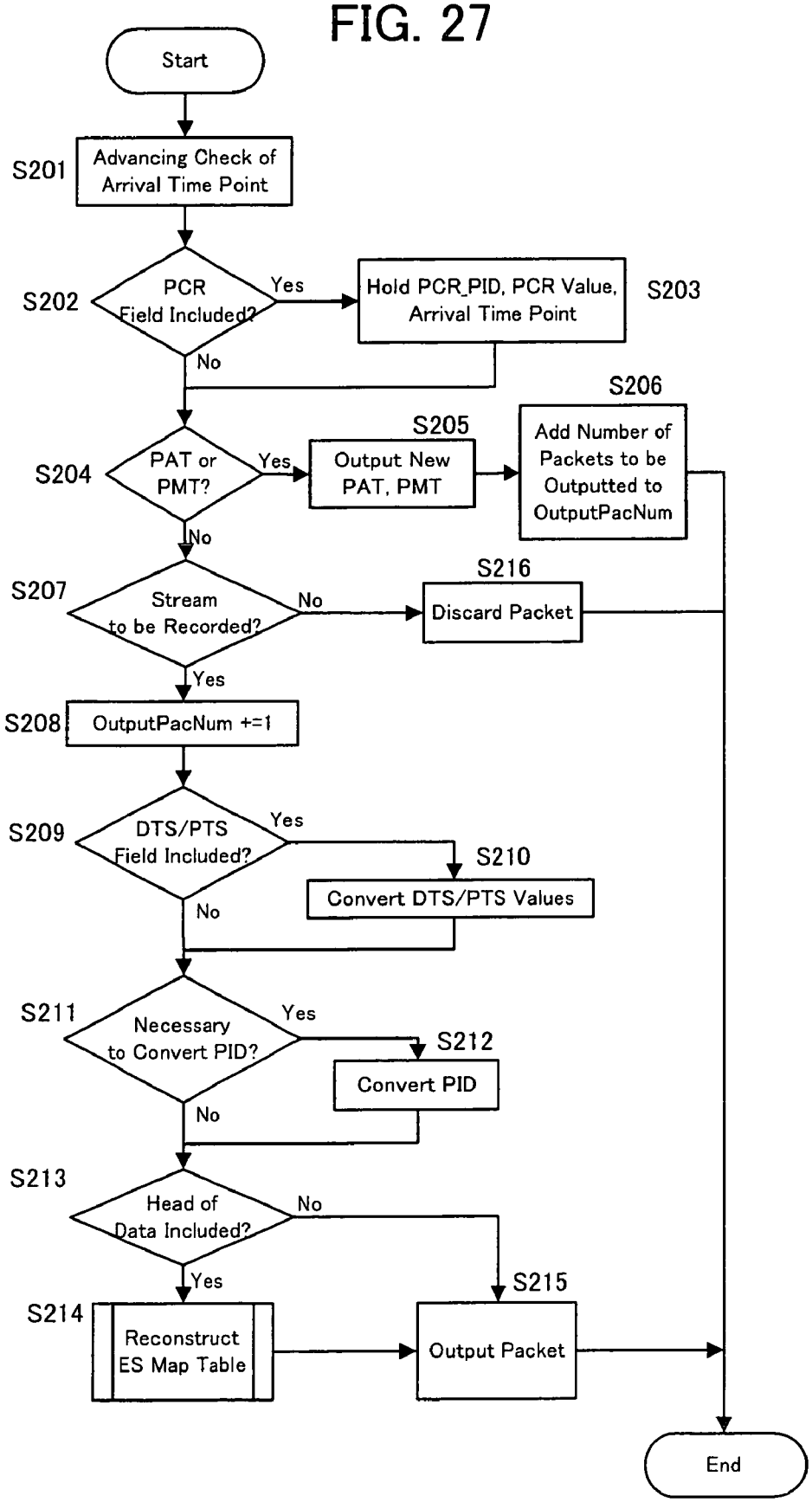
FIG. 27 is a flowchart showing TS packet processing in FIG. 26.
Figure 28:
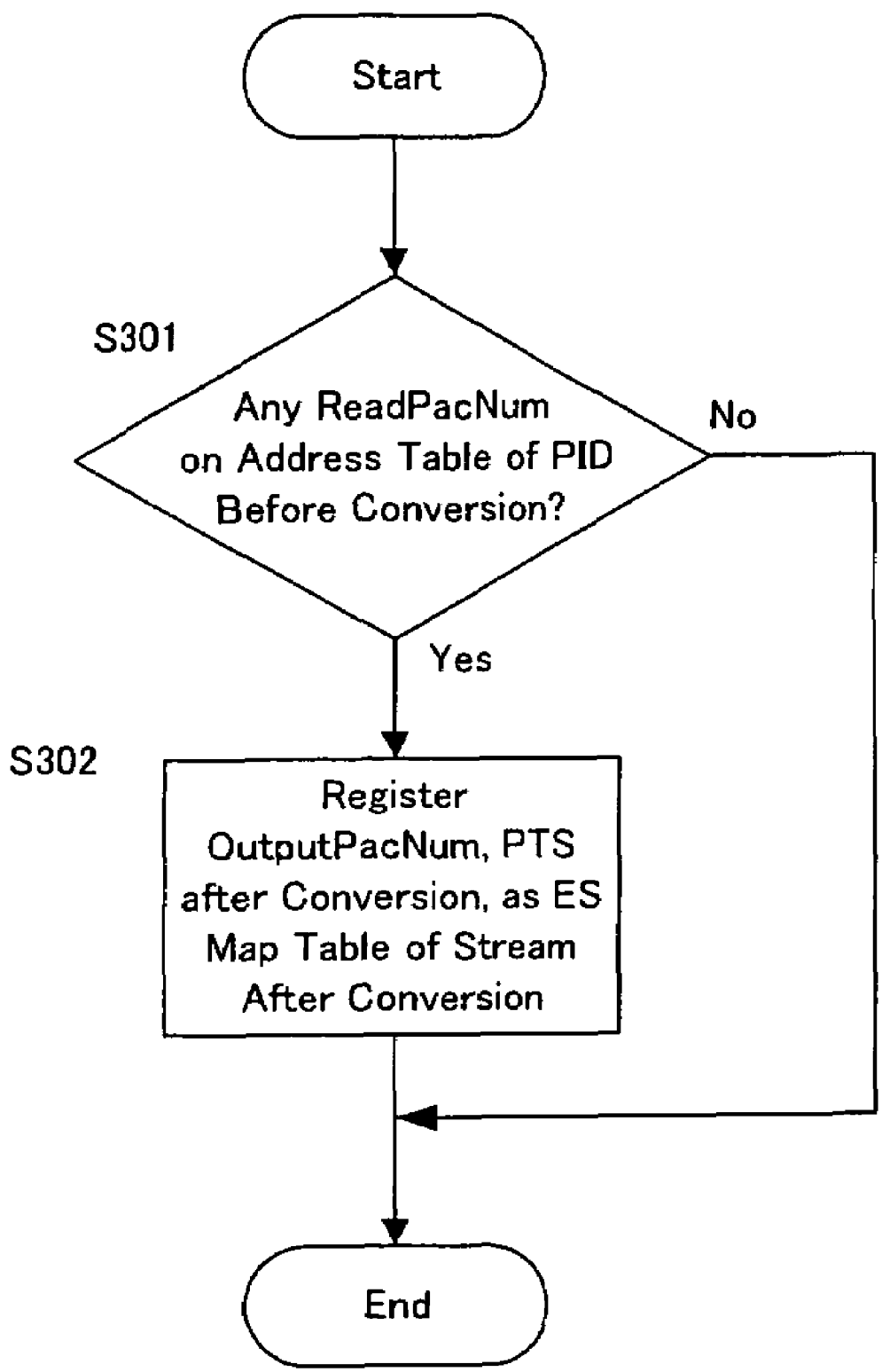
FIG. 28 is a flowchart showing a process of reconstructing the ES map table in FIG. 27.

Next, with reference to FIG. 24 to FIG. 27, an embodiment of the information recording/reproducing apparatus of the present invention is discussed. Here, FIG. 24 is a block diagram showing the information recording/reproducing apparatus. FIG. 25 to FIG. 27 are flowcharts showing the operation thereof.

In FIG. 24, an information recording/reproducing apparatus 500 is constructed to record information onto the optical disc 100 as being one example of the above-mentioned second recording medium, from a TS object data source 700 as being one example of the above-mentioned first recording medium. Moreover, the apparatus 500 is constructed to reproduce the information from the optical disc 100 on which the information is recorded in the above manner. In other words, the information recording/reproducing apparatus 500 in this embodiment is for recording and reproduction. Nevertheless, an embodiment of the information recording apparatus according to the present invention can be constructed basically with the record system of the apparatus 500.

Particularly in the embodiment, as discussed below, one example of the "obtaining device" of the present invention is constructed from a system controller 520 including a file system/logical structure data generator 521. Alternatively, one example of the "obtaining device" of the present invention is constructed from a part of the TS object data source 700 and the system controller 520. On the other hand, one example of the "processing device" of the present invention is constructed from the system controller 520 including the file system/logical structure data generator 521. Then, one example of the "recording device" of the present invention is constructed from a modulator 606, a formatter 607, and an optical pickup. Incidentally, as the TS object data source 700, it may be made of a hard disk drive apparatus with a built-in hard disk as being a recording medium main body, or may be made of an optical disc drive apparatus on which an optical disc as being a recording medium main body is detachably loaded.

The information recording/reproducing apparatus 500 is provided with: an optical pickup 502; a servo unit 503; a spindle motor 504; a demodulator 506; a demultiplexer 507; a video decoder 511; an audio decoder 512; a sub-picture decoder 513; an adder 514; the system controller 520; a memory 530; the modulator 606; the formatter 607. The system controller 520 includes the file system/logical structure data generator 521 and a file system/logical structure data reader 522. Furthermore, the memory 530 and a user interface 720 to give a user input, such as title information, are connected to the system controller 520.

Among these constitutional elements, the demodulator 506, the demultiplexer 507, the video decoder 511, the audio decoder 512, the sub-picture decoder 513, the adder 514 mainly constitute the reproduction system. On the other hand, among these constitutional elements, the modulator 606 and the formatter 607 mainly constitute the record system. The optical pickup 502, the servo unit 503, the spindle motor 504, the system controller 520, the memory 530 and the user interface 720 to give the user input, such as title information, are generally shared for both the reproduction system and the record system. Furthermore, for the record system, the TS object data source 700 is prepared. Furthermore, the file system/logical structure data generator 521 disposed in the system controller 520 is used mainly in the record system, and the file system/logical structure reader 522 is used mainly in the reproduction system.

The optical pickup 502 irradiates the optical disc 100 with a light beam LB such as a laser beam, at the first power as reading light for the reproduction, and at the second power with the light beam LB being modified as writing light for recording. The servo unit 503 performs focus servo, tracking servo and the like for the optical pickup 502, as well as the spindle servo for the spindle motor 504, under the control of a control signal Sc1 outputted from the system controller 520, during the reproduction and recording. The spindle motor 504 is controlled under the spindle servo by the servo unit 503, for rotating the optical disc 100 at a predetermined speed.

(i) Structure and Operation of Record System

Next, with reference to FIG. 24 to FIG. 27, a structure related to the record system and the operation thereof, out of constitutional elements constituting the record system of the information recording/reproducing apparatus 500 will be explained.

Here, the case where the TS object, already prepared in the TS object data source 700, is recorded by the information recording/reproducing apparatus 500 will be discussed, with reference to FIG. 24 and FIG. 25.

In FIG. 24, the TS object data source 700 as one example of the first recording medium is provided with a recording storage, such as a hard disk, a video tape, and a memory, and stores TS object data D1 therein. The TS object data D1 is constructed in the TS object data source 700, by receiving digital broadcasting including a plurality of programs and storing it after performing predetermined processing for it, or storing it as it is, for example.

In FIG. 25, at first, information about each title (e.g. the structural content of the play list or the like) logically constructed on the optical disc 100 by using the TS object data D1 is inputted to the system controller 520, as a user input I2, such as title information, from the user interface 720. Then, the system controller 520 imports the user input I2, such as title information, from the user interface 720 (step S21: Yes and step S22). In this case, the user interface 720, under the control of a control signal Sc4 from the system controller 520, can perform input processing in response to the content to be recorded, such as selection on a title menu screen. Incidentally, if the user input is already performed (the step S21: No), the processing is omitted.

Then, the TS object data source 700 outputs the TS object data D1, under the control of a control signal Sc7 to indicate the data reading from the system controller 520. Then, the system controller 520 imports the TS object data D1 from the TS object data source 700 (step S23), and analyzes the data array of the TS object data D1 (e.g. a recording data length and the like) and the structure of each elementary stream packet structure (e.g. understanding of ES_PID (elementary stream packet identification number) described later), on the basis of the information for control, such as the PAT and the PMT, which is packetized with the video data and the like, as described above, or on the basis of the information for control, such as the ES_PID, which is not packetized, due to the TS analysis feature in the file system/logical structure data generator 521 (step S24).

Then, the system controller 520 prepares the disc information file 110, the play list information file 120, the object information file 130, and the file system 105 (refer to FIG. 3), as logical information file data D4, by using the file system/logical structure data generator 521, from the imported user input I2, such as title information, and the analysis results of the data array analysis of the TS object data D1 and each elementary stream (step S25). The memory 530 is used in preparing the logical information file data D4.

Incidentally, variations in which the data about the structural information of each elementary stream and the data array of the TS object data D1 may be prepared in advance can be naturally considered, and they are within a scope of the embodiment.

In FIG. 24, the formatter 607 is an apparatus for formatting the data array to store both the TS object data D1 and the logical information file data D4 onto the optical disc 100. More specifically, the formatter 607 is provided with a switch Sw1, and is switching-controlled by a switch control signal Sc5 from the system controller 520. When formatting the TS object data D1, the formatter 607 connects the switch Sw1 to a ① side, to thereby output the TS object data D1 from the TS object data source 700. Incidentally, the transmission control of the TS object data D1 is performed by the control signal Sc7 from the system controller 520. On the other hand, when formatting the logical information file data D4, the formatter 607 is switching-controlled by the switch signal Sc5 from the system controller 520, and connects the switch Sw2 to a ② side, to thereby output logical information file data D4.

In a step S26 in FIG. 25, by the switching-control of the formatter 607 constructed in the above manner, (i) the logical information file data D4 from the file system/logical structure data generator 521 in the step S25 or (ii) the TS object data D1 from the TS object data source 700 is outputted through the formatter 607 (step S26).

The selective output from the formatter 607 is transmitted to the modulator 606 as disc image data D5, modulated by the modulator 606, and recorded onto the optical disc 100 through the optical pickup 502 (step S27). Even the disc recording control at this time is performed by the system controller 520.

If both the logical information file data D4 generated in the step S25 and the TS object data D1 corresponding thereto are not recorded yet, the operational flow returns to the step S26, and the recording is continued (the step S27: No). Incidentally, as for the recording order, either of the logical information file data D4 and the TS object data D1 corresponding thereto may be the first or the second.

On the other hand, if the both are already recorded, it is judged whether or not the recording onto the optical disc 100 is to be ended, on the basis of the presence or absence of an end command (step S29). If not to be ended (the step S29: No), the operational flow returns to the step S21, and the recording processing is continued. On the other hand, if to be ended (the step S29: Yes), a series of recording processing is ended.

Consequently, by virtue of the information recording/reproducing apparatus 500, it is possible to obtain the TS object data in the multi program format from the TS object data source 700 and record it as the TS object data in the single program format onto the optical disc 100.

Incidentally, in the example shown in FIG. 25, after the logical information file data D4 is prepared in the step S25, the data output of the logical information file data D4 and the TS object data D1 corresponding thereto is performed in the step S26. However, it is possible to perform the output of the TS object data D1 and the recording onto the optical disc 100 before the step S25, and after or in parallel with the recording, the logical information file data D4 can be generated and recorded.

(ii) Structure and Operation in Reproduction System

Next, with reference to FIG. 24, the specific structure and operation of each constitutional element constituting the reproduction system of the information recording/reproducing apparatus 500 will be explained.

In FIG. 24, by the user interface 720, the title to be reproduced from the optical disc 100, its reproduction condition and the like are inputted to the system controller 520, as the user input I2, such as the title information and the like. In this case, under the control of the control signal Sc4 from the system controller 520, the input processing suitable for the content to be reproduced, such as selection on a title menu screen, can be achieved by the user interface 720.

Responding to this, the system controller 520 controls the disc reproduction with respect to the optical disc 100, and the optical pickup 502 transmits a reading signal S7 to the demodulator 506.

The demodulator 506 demodulates a recorded signal recorded onto the optical disc 100 from this reading signal S7, and outputs it as demodulated data D7. The logical information file data (i.e. the file system 105, the disc information file 110, the P list information file 120, and the object information file 130, shown in FIG. 3) included in this demodulated data D7 as being a not-multiplexed information part is supplied to the system controller 520. On the basis of this logical information file data, the system controller 520 executes various reproduction control, such as processing of determining a reproduction address and controlling the optical pickup 502.

On the other hand, as for the TS object data included as the multiplexed information part in the demodulated data D7, the demultiplexer 507 demultiplexes the TS object data, under the control of the control signal Sc2 from the system controller 520. Here, when the access to the reproduction position address is terminated under the reproduction control by the system controller 520, the control signal Sc2 is transmitted to start the demultiplexing.

The video packet, the audio packet and the sub-picture packet are transmitted respectively from the demultiplexer 507 and supplied respectively to the video decoder 511, the audio decoder 512 and the sub-picture decoder 513. Then, video data DV, audio data DA and sub-picture data DS are decoded, respectively.

Incidentally, although the packets obtained by packetizing the PAT or the PMT, included in the transport stream shown in FIG. 6, are included as a part of the demodulated data D7, respectively, they are discarded or abandoned at the demultiplexer 507.

The adder 514 is controlled by a control signal Sc3 giving an instruction of the mixing from the system controller 520, and mixes or superimposes in a predetermined timing the video data DV and the sub-picture data DS, which are respectively decoded at the video decoder 511 and the sub-picture decoder 513. The result is outputted as a video output from the information recording/reproducing apparatus 500 to a TV monitor, for example.

On the other hand, the audio data DA decoded at the audio decoder 512 is outputted as an audio output from the information recording/reproducing apparatus 500 to an external speaker, for example.

Particularly in the embodiment, in (i) the structure of the record system and the operation thereof, discussed above, the transport stream in the multi program format is obtained from the TS object data source 700, and the conversion processing or the reconstruction processing is performed with respect to the packetized various logical information, such as the PTS, or the not packetized various logical information, such as the ES map table, and then recorded onto the optical disc 100. Therefore, it is possible to record the object data reconstructed to the transport stream in the single program format, onto the optical disc 100. Thus, the recording can be performed even if the optical disc 100 has such a restriction that only the transport stream in the single program format can be recorded thereon. In addition, in the TS object data source 700, even if a plurality of video streams are included in the transport stream, the recording can be performed not only on the optical disc 100 having such a restriction that only the single program format can be recorded thereon, but also on the optical disc 100 having such a restriction that only the single video format can be recorded thereon, by extracting and recording main one of the video streams, for example.

(Flow of Obtainment, Conversion and Recording Processing, by Information Recording/Reproducing Apparatus)

Next, with reference to FIG. 26 to FIG. 27, the specific example of a processing routine for obtaining, converting, and recording the ATS, the PTS, and the like, by the information recording/reproducing apparatus 500 in the embodiment will be discussed in detail.

As the outline of the whole, upon recording by the information recording/reproducing apparatus 500, a plurality of TS packets are obtained, and at the same time, the various information for reproduction control, such as the PAT, PMT, ES_PID, ATS, and PTS, of the plurality of TS packets is obtained from the TS object data source 700 which includes a hard disk drive, an optical disc drive, a tuner, or the like, and which functions as one example of the "obtaining device" of the present invention, to the system controller 520. Next, on the basis of the obtained ATS, by the system controller 520 which functions as one example of the "processing device" of the present invention, a display time point shown by the PTS and shown on the time axis which is related to a plurality of programs and which is based on mutually different PCR values, is converted to a display time point shown on the same time axis which is based on the same PCR value. Then, from the system controller 520, a processed PTS indicating the converted display time point is outputted. Then, by the formatter 607, the modulator 606, the optical pickup 502, or the like, which function as one example of the "recording device" of the present invention, the transport stream (TS) is recorded onto the optical disc 100, in such a form that the outputted processed PTS is appended to each packet in at least one portion of a plurality of packets which belong to a plurality of elementary streams (ES) which constitute the transport stream (TS) to be recorded onto the optical disc 100.

With reference to FIG. 26, an entire flow in the conversion/recording processing routine will be discussed.

At first, in FIG. 26, on the TS object data source 700, the packet ID (ES_PID) of an elementary stream to be converted and recorded, the program map PID indicating the number of the packet ID (ES_PID) of the PMT (Program Map Table) of the elementary stream, and the reference packet designation information (PCR_PID) of the elementary stream are obtained. Specifically, (201) is illustrated as the ES_PID, (200) as the program map PID, and (201) as the reference packet designation information (PCR_PID) (step S101).

Then, the ATS (arrival time point information) of the elementary stream and the PCR value (program time point reference value) are obtained. Specifically, ATS#1, PCR#1, ATS#2 and PCR#2 are illustrated (step S102).

Then, the program map PID, the reference packet designation information (PCR_PID), and the ES_PID after the conversion of the ES_PID to be converted and recorded, which define a time axis which is a standard in the conversion onto the same time axis, are determined. Specifically, (100) is illustrate as the program map PID, (101) as the reference packet designation information (PCR_PID), and (103) as the ES_PID after the conversion (step S103).

Then, a new PAT and PMT are prepared. Specifically, in the information management table of the PAT (the TS packet with the ES_PID of (000)), the ES_PID of the PMT is reconstructed to only one, which is (100) (step S104).

Then, a read pac No (ReadPacNum) is initiated to zero, which is a variable for counting the number of all the TS packets, and an output No (OutputPacNum) is initiated to zero, which is a variable for counting the number of TS packets to be outputted (step S105).

Then, the TS packets on the first recording medium are read one by one, and the read pac No is incremented by one (step S106).

Then, TS packet processing is performed (step S107). Incidentally, the TS packet processing in the step S107 will be discussed in detail later, with reference to FIG. 27.

Then, it is judged whether or not all the TS packets are converted and recorded (step S107).

As a result of the judgment, if all the TS packets are converted and recorded (the step S107: Yes), the object information file is recorded by the reconstructed ES map table or the like. On the other hand, if all the TS packets are not converted and recorded (the step S107: No), the TS packets on the first recording medium are read one by one, and the read pac No is incremented by one (the step S106).

Next, with reference to FIG. 27, the TS packet processing (step S107) in FIG. 26 will be discussed in detail.

Figure 17:
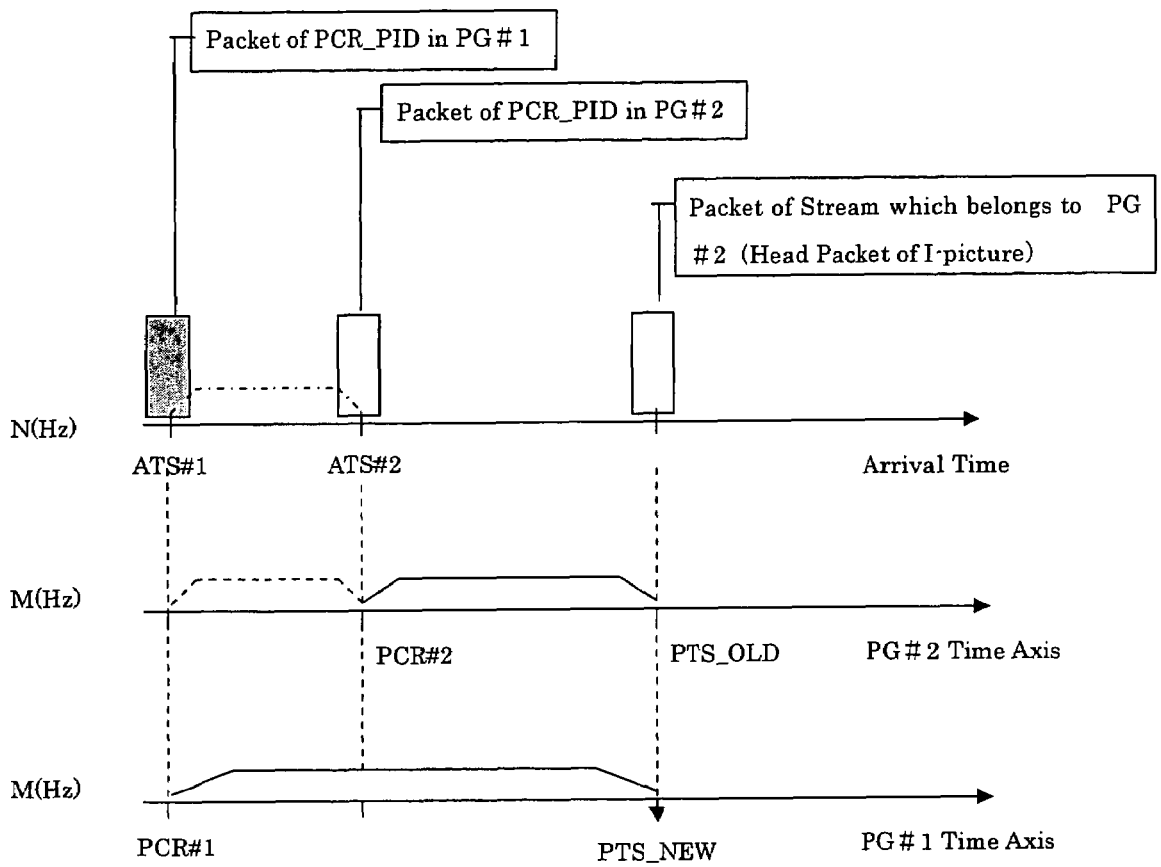
FIG. 17 is a conceptual view schematically showing a procedure of converting a display time point indicated on the time axis of the show #2 (PG#2) to a display time point indicated on the time axis of the show #1 (PG#1), in the embodiment.
Figure 18:
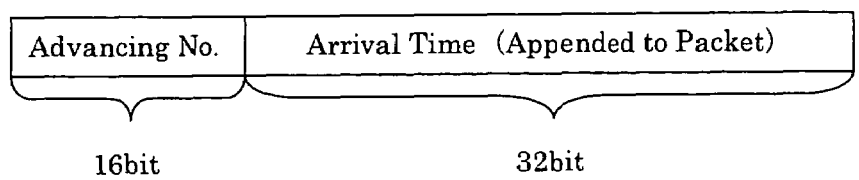
FIG. 18 is a conceptual view schematically showing the data structure of an arrival time (packet arrival time stamp), in the embodiment.

In FIG. 27, at first, the advancing check of the arrival time point of the TS packet is run, and the advancing processing, discussed in FIG. 17, is performed (step S201).

Then, it is judged whether or not the TS packet includes the PCR value, by checking the PCR flag (refer to FIG. 4) (step S202). If it includes the PCR value (the step S202: Yes), the number of the reference packet designation information (PCR_PID), the PCR value, and the arrival time point are held in a memory. Specifically, (201) is illustrated as the number of the reference packet designation information (PCR_PID), "PCR#2" as the PCR value, and "ATS#2# as the arrival time point (step S203).

On the other hand, as a result of the step S202, if it does not include the PCR value (the step S202: No), moreover, it is judged whether or not the TS packet is the PAT or the PMT (step S204). If the TS packet is the PAT or the PMT (the step S204: Yes), a new PAT or PMT is outputted (step S205).

Then, the number of packets to be outputted is added to the output No (OutputPacNum) which is a variable (step S206).

On the other hand, as a result of the step S204, if the TS packet is not the PAT or the PMT (the step S204: No), moreover, it is judged whether or not the TS packet is the elementary stream to be converted and recorded (step S207). Here, if the TS packet is the elementary stream to be converted and recorded (the step S207: Yes), the output No (OutputPacNum) which is a variable is incremented by only "1".

Incidentally, whether or not it is the elementary stream to be converted and recorded is determined in accordance with whether or not to be designated as what to be recorded, directly or indirectly, by the user input through the user interface 720 with respect to the information recording/reproducing apparatus 500, for example. In other words, by including the judgment processing in the step S207, it is also possible to record only a part of all the elementary streams constituting the transport stream stored in the TS object data source 700. For example, it is also possible to record only two main angle video streams, out of three or more angle video streams.

Then, it is judged whether or not the TS packet includes the PTS or a DTS field (step S209). Here, the DTS (Decoding Time Stamp) is time point management information for decoding. On the MPEG standard, if the PTS differs from the DTS, the both information is appended, and if the PTS coincide with the DTS, the information about the PTS is appended. If the TS packet includes the PTS or DTS field (the step S209: Yes), the PTS or DTS is converted, as described in the explanation of FIG. 17 (step S210).

Then, it is judged whether or not it is necessary to convert the ES_PID of the TS packet (step S211). If it is necessary to convert the ES_PID of the TS packet (the step S211: Yes), the ES_PID of the TS packet is converted (step S212). Incidentally, if the assignment of the ES_PID for each elementary stream is not changed, it is judged that it is not necessary to convert the ES_PID.

Then, it is judged whether or not the TS packet includes the head of the entity data of the PES packet (step S213). If the TS packet includes the head of the entity data of the PES packet (the step S213: Yes), the ES map table (refer to FIG. 14 and FIG. 22) is reconstructed, including the ES address information and the like (step S214).

Then, the TS packet is outputted (step S215).

On the other hand, as a result of the judgment in the step S207, if the TS packet is not the elementary stream to be converted and recorded (the step S207: No), the TS packet is discarded or abandoned (step S216).

Next, with reference to FIG. 27, the reconstruction processing (the step S214) of the ES map table in FIG. 27 will be discussed in detail.

In FIG. 27, at first, it is judged whether or not there is the read pack No (ReadPacNum) which is a variable on the address table of the ES_PID before the conversion of the ES address information (step S301). If there is the read pack No (ReadPacNum) which is a variable on the address table of the ES_PID before the conversion of the ES address information (the step S301: Yes), the output No (OutputPacNum) which is a variable and the PTS or DTS after the conversion are registered, as the ES address information of the elementary stream after the conversion (step S302).

On the other hand, if there is no read pack No (ReadPacNum) which is a variable on the address table of the ES_PID before the conversion of the ES address information (the step S301: No), the step S302 is omitted.

As discussed in detail with reference to FIG. 1 to FIG. 27, according to the information recording/reproducing apparatus 500 and the optical disc 100 in the embodiment, it is possible to read information from the TS object data source 700, such as a hard disk, on which the transport stream in the multi program format is recorded, and record it as the transport stream in the single program format. Then, from the optical disc 100 in the embodiment on which the transport stream in the single program format is recorded, it is possible to reproduce a plurality of content information, initially corresponding to a plurality of programs on the TS object data source 700, as a plurality of content information corresponding to a single program. Particularly at that time, it is possible to perform the reproduction change of the plurality of content information, seamlessly or non-seamlessly, such as angle change, multi view change, and multi vision change, as processing in the single program, by a stream change which is a process of changing one or a plurality of elementary streams.

Incidentally, in the above-mentioned embodiment, the explanation is given on an optical disc and a hard disk as one example of the information recording medium, or the first or second recording medium, and on a recorder related to the optical disc and the hard disk as one example of the information recording/reproducing apparatus. Nevertheless, the present invention is not limited to the optical disc, the hard disk, and the recorder thereof, but is applicable to other various information recording media and the recorders thereof, supporting high density recording or a high transfer rate.

The present invention is not limited to the above-described embodiment, and various changes may be made, if desired, without departing from the essence or spirit of the invention which can be read from the claims and the entire specification. An information recording apparatus and method, an information recording medium, and a computer program for recording control, all of which involve such changes, are also intended to be within the technical scope of the present invention.

INDUSTRIAL APPLICABILITY

An information recording apparatus and method, an information recording medium, and a computer program for recording control according to the present invention, can be applied to an optical disc or the like, on which a stream in the multi program format, such as the TS (Transport Stream) of the MPEG (Moving Picture Expert Group) standard, a stream in the single program format, such as the PT (Program Stream), or the like are recorded. Moreover, they can be applied to a DVD recorder or the like. Furthermore, they can be applied to an information recording medium, an information recording apparatus, or the like, which are mounted on or can be connected to various computer equipment for consumer or industrial use, for example.

The invention claimed is:

1. An information recording apparatus for reading information from a first recording medium on which a first entire stream which has a plurality of time point references is recorded, and for recording the read information onto a second recording medium as a second entire stream which has a mutually equal time point reference, wherein (i) on the first recording medium, a plurality of portion streams, each of which is constructed from a series of content information and which constitute a plurality of programs having mutually independent time point references, are packetized and multiplexed by a unit of packet, which is a physically accessible unit and which stores therein a piece of the content information, and recorded as the first entire stream, and moreover, there are recorded correspondence definition information for defining a correspondence relationship between a plurality of packets multiplexed on a time axis and the plurality of portion streams, arrival time point information indicating an arrival time point of each packet with respect to at least one portion of the plurality of packets, and display time point information for showing a display time point of each packet on a time axis independent for each of the programs with respect to at least one portion of the plurality of packets, (ii) on the second recording medium, a plurality of portion streams constituting a single program having a mutually equal time point reference can be packetized and multiplexed by the unit of packet, and can be recorded as the second entire stream, and said information recording apparatus comprises:

an obtaining device for obtaining the plurality of packets and the correspondence definition information, the arrival time point information, and the display time point information, with respect to the plurality of packets, from the first recording medium;

a processing device for converting a display time point which is shown by the obtained display time point information on mutually different time axes related to the plurality of programs, to a display time point shown on a same time axis, on the basis of the obtained arrival time point information, and for outputting processed display time point information indicating the converted display time point; and a recording device for recording the second entire stream onto the second recording medium in such a form that the outputted processed display time point information is appended to each packet in at least one portion of a plurality of packets which belong to the plurality of elementary streams which constitute the second entire stream.

2. The information recording apparatus according to claim 1, wherein time point reference information indicating a time reference of the time axis for each of the programs is further recorded on the first recording medium, and said processing device converts the display time point which is shown by the obtained display time point information on the mutually different time axes related to the plurality of programs, to the display time point shown on the same time axis, on the basis of the time reference indicated by the time point reference information.

3. The information recording apparatus according to claim 2, wherein said processing device converts the time point reference information to time point reference information indicating a time point reference of the same time axis, and outputs it as processed time point reference information, and said recording device further records the processed time point reference information onto the second recording medium.

4. The information recording apparatus according to claim 1, wherein reference packet designation information for designating a packet including time point reference information indicating a time reference of the time axis is included on the first recording medium, and said processing device converts the display time point which is shown by the obtained display time point information on the mutually different time axes related to the plurality of programs, to the display time point shown on the same time axis, on the basis of the time reference indicated by the time point reference information which is included in the packet designated by the reference packet designation information.

5. The information recording apparatus according to claim 4, wherein
said processing device converts the reference packet designation information to reference packet designation information for designating a packet including time point reference information indicating a time reference of the same time axis, and outputs it as processed reference packet designation information, and
said recording device further records the processed reference packet designation information onto the second recording medium.

6. The information recording apparatus according to claim 1, wherein
said processing device converts the correspondence definition information to correspondence definition information for designating a correspondence relationship between a plurality of packets multiplexed on the same time axis and the plurality of portion streams, and outputs it as processed correspondence definition information, and said recording device further records the processed correspondence definition information onto the second recording medium.

7. The information recording apparatus according to claim 6, wherein
a packet number of a head packet including a piece of the content information which starts to be displayed at the display start time point for each of the portion streams is further recorded as address information indicating an address of the packet, on the first recording medium,
said processing device converts the address information, to address information of a packet corresponding to the processed correspondence definition information, and outputs processed address information, and said recording device further records the processed address information onto the second recording medium.

8. The information recording apparatus according to claim 6, wherein said recording device records an object information file which stores therein at least one of the processed correspondence definition information and the processed address information and which is not packetized by the unit of packet.

9. The information recording apparatus according to claim 6, wherein
related group definition information for defining a group having a particular relation out of a plurality of a series of contents which constitute the plurality of portion streams as a related group is further recorded on the first recording medium,
said obtaining device further obtains the related group definition information,
said processing device converts the obtained related group definition information to a related group corresponding to the processed correspondence definition information, and outputs processed related group definition information indicating the converted related group, and
said recording device further records the processed related group definition information onto the second recording medium.

10. The information recording apparatus according to claim 9, wherein
sub-group definition information for defining a group of a plurality of portion streams which are mutually change-reproducible in the related group, as a sub group is further recorded on the first recording medium,
said obtaining device further obtains the sub-group definition information,
said processing device converts the sub-group definition information to a sub group corresponding to the processed correspondence definition information, and outputs processed subgroup definition information indicating the converted sub group, and
said recording device further records the processed sub-group definition information onto the second recording medium.

11. The information recording apparatus according to claim 10, wherein
the related group definition information and the sub-group definition information are stored in an object information file which is not packetized by the unit of packet on the first recording medium,
said obtaining device further obtains the object information file, and
said recording device records a processed object information file which stores therein the processed related group definition information and the processed sub-group definition information and which is not packeized by the unit of packet onto the second recording medium.

12. The information recording apparatus according to claim 1, wherein
said obtaining device extracts a packet to be recorded onto the second recording medium, from the plurality of packets recorded on the first recording medium in accordance with a set recording condition, and
said processing device processes the extracted packet.

13. The information recording apparatus according to claim 1, wherein
the first recording medium is a hard disk and the second recording medium is an optical disc,
said obtaining device includes a hard disk drive apparatus capable of performing reading on the hard disk, and
said recording device includes an optical disc drive apparatus capable of performing writing on the optical disc.

14. The information recording apparatus according to claim 1, wherein
each of the arrival time point and the display time point is represented by a count value counted by a same or different clock, and
said processing device converts a count value related to the obtained display time point information to a count value shown on the same time axis, on the basis of a count value related to the obtained arrival time point information, to thereby output the processed display time point information.

15. The information recording apparatus according to claim 1, wherein
the correspondence definition information is packetized and multiplexed by the unit of packet on the first recording medium, and
said recording device records the correspondence definition information packetized by the unit of packet, onto the second recording medium, in a state of being packetized by the unit of packet.

16. The information recording apparatus according to claim 1, wherein the correspondence definition information is stored in an object information file which is not packetized by the unit of packet on the first recording medium, and said obtaining device collectively obtains the correspondence definition information from the object information file which is not packetized.

17. The information recording apparatus according to claim 1, wherein the plurality of packets include a packet including a portion which stores therein the arrival time point information and a packet payload which stores therein a piece of the content information, and said obtaining device obtains the arrival time point information from the packet.

18. An information recording method of reading information from a first recording medium on which a first entire stream which has a plurality of time point references is recorded, and of recording the read information onto a second recording medium as a second entire stream which has a mutually equal time point reference, wherein (i) on the first recording medium, a plurality of portion streams, each of which is constructed from a series of content information and which constitute a plurality of programs having mutually independent time point references, are packetized and multiplexed by a unit of packet, which is a physically accessible unit and which stores therein a piece of the content information, and recorded as the first entire stream, and moreover, there are recorded correspondence definition information for defining a correspondence relationship between a plurality of packets multiplexed on a time axis and the plurality of portion streams, arrival time point information indicating an arrival time point of each packet with respect to at least one portion of the plurality of packets, and display time point information for showing a display time point of each packet on a time axis independent for each of the programs with respect to at least one portion of the plurality of packets, (ii) on the second recording medium, a plurality of portion streams constituting a single program having a mutually equal time point reference can be packetized and multiplexed by the unit of packet, and can be recorded as the second entire stream, and said information recording method comprises:

an obtaining process of obtaining the plurality of packets and the correspondence definition information, the arrival time point information, and the display time point information, with respect to the plurality of packets, from the first recording medium;

a processing process of converting a display time point which is shown by the obtained display time point information on mutually different time axes related to the plurality of programs, to a display time point shown on a same time axis, on the basis of the obtained arrival time point information, and of outputting processed display time point information indicating the converted display time point; and a recording process of recording the second entire stream onto the second recording medium in such a form that the outputted processed display time point information is appended to each packet in at least one portion of a plurality of packets which belong to the plurality of elementary streams which constitute the second entire stream.

19. An information recording medium on which recording is performed as the second recording medium by the information recording apparatus for reading information from a first recording medium on which a first entire stream which has a plurality of time point references is recorded, and for recording the read information onto a second recording medium as a second entire stream which has a mutually equal time point reference, wherein (i) on the first recording medium, a plurality of portion streams, each of which is constructed from a series of content information and which constitute a plurality of programs having mutually independent time point references, are packetized and multiplexed by a unit of packet, which is a physically accessible unit and which stores therein a piece of the content information, and recorded as the first entire stream, and moreover, there are recorded correspondence definition information for defining a correspondence relationship between a plurality of packets multiplexed on a time axis and the plurality of portion streams, arrival time point information indicating an arrival time point of each packet with respect to at least one portion of the plurality of packets, and display time point information for showing a display time point of each packet on a time axis independent for each of the programs with respect to at least one portion of the plurality of packets, (ii) on the second recording medium, a plurality of portion streams constituting a single program having a mutually equal time point reference can be packetized and multiplexed by the unit of packet, and can be recorded as the second entire stream, and the information recording apparatus comprises:

an obtaining device for obtaining the plurality of packets and the correspondence definition information, the arrival time point information, and the display time point information, with respect to the plurality of packets, from the first recording medium;

a processing device for converting a display time point which is shown by the obtained display time point information on mutually different time axes related to the plurality of programs, to a display time point shown on a same time axis, on the basis of the obtained arrival time point information, and for outputting processed display time point information indicating the converted display time point; and a recording device for recording the second entire stream onto the second recording medium in such a form that the outputted processed display time point information is appended to each packet in at least one portion of a plurality of packets which belong to the plurality of elementary streams which constitute the second entire stream, and on which a plurality of portion streams constituting a single program having a mutually equal time point reference are packetized and multiplexed by the unit of packet, and are recorded as the second entire stream.

20. An information recording medium on which a computer program is recorded, said Acomputer program for recording control to control a computer disposed at an information recording apparatus for reading information from a first recording medium on which a first entire stream which has a plurality of time point references is recorded, and for recording the read information onto a second recording medium as a second entire stream which has a mutually equal time point reference, wherein (i) on the first recording medium, a plurality of portion streams, each of which is constructed from a series of content information and which constitute a plurality of programs having mutually independent time point references, are packetized and multiplexed by a unit of packet, which is a physically accessible unit and which stores therein a piece of the content information, and recorded as the first entire stream, and moreover, there are recorded correspondence definition information for defining a correspondence relationship between a plurality of packets multiplexed on a time axis and the plurality of portion streams, arrival time point information indicating an arrival time point of each packet with respect to at least one portion of the plurality of packets, and display time point information for showing a display time point of each packet on a time axis independent for each of the programs with respect to at least one portion of the plurality of packets, (ii) on the second recording medium, a plurality of portion streams constituting a single program having a mutually equal time point reference can be packetized and multiplexed by the unit of packet, and can be recorded as the second entire stream, and an information recording process comprising:

an obtaining process of obtaining the plurality of packets and the correspondence definition information, the arrival time point information, and the display time point information, with respect to the plurality of packets, from the first recording medium;

a processing process of converting a display time point which is shown by the obtained display time point information on mutually different time axes related to the plurality of programs, to a display time point shown on a same time axis, on the basis of the obtained arrival time point information, and for outputting processed display time point information indicating the converted display time point; and a recording process of recording the second entire stream onto the second recording medium in such a form that the outputted processed display time point information is appended to each packet in at least one portion of a plurality of packets which belong to the plurality of elementary streams which constitute the second entire stream, said program making the computer function as at least a part of said obtaining process, said processing process, and said recording process, said information recording medium comprising:

a user data to record one part of said computer program; and a lead in area to record other part of said computer program.

* * * * *